US006941358B1

(12) United States Patent
Joiner et al.

(10) Patent No.: US 6,941,358 B1
(45) Date of Patent: *Sep. 6, 2005

(54) ENTERPRISE INTERFACE FOR NETWORK ANALYSIS REPORTING

(75) Inventors: Herbert V. Joiner, Plano, TX (US); Praveen Raghuraman, Dallas, TX (US); Ken W. Elwell, Addison, TX (US)

(73) Assignee: Networks Associates Technology, Inc., Santa Clara, CA (US)

( * ) Notice: Subject to any disclaimer, the term of this patent is extended or adjusted under 35 U.S.C. 154(b) by 390 days.

This patent is subject to a terminal disclaimer.

(21) Appl. No.: 10/029,687

(22) Filed: Dec. 21, 2001

(51) Int. Cl.[7] .................... G06F 15/177; G06F 15/173
(52) U.S. Cl. ...................................... 709/220; 709/224
(58) Field of Search ................. 345/764; 709/220–222, 709/223–224; 703/13; 707/103 R

(56) References Cited

U.S. PATENT DOCUMENTS

| | | | | |
|---|---|---|---|---|
| 5,758,083 A | * | 5/1998 | Singh et al. ................. | 709/223 |
| 5,907,696 A | * | 5/1999 | Stilwell et al. ............... | 703/13 |
| 5,913,037 A | * | 6/1999 | Spofford et al. ............. | 709/224 |
| 6,108,700 A | * | 8/2000 | Maccabee et al. .......... | 709/224 |
| 6,108,782 A | * | 8/2000 | Fletcher et al. ............. | 709/224 |
| 6,122,639 A | * | 9/2000 | Babu et al. ............. | 707/103 R |
| 6,137,782 A | * | 10/2000 | Sharon et al. ................ | 709/221 |
| 6,266,694 B1 | | 7/2001 | Duguay et al. .............. | 709/223 |
| 6,271,845 B1 | * | 8/2001 | Richardson .................. | 345/764 |
| 6,314,460 B1 | | 11/2001 | Knight et al. ............... | 709/220 |
| 6,347,374 B1 | * | 2/2002 | Drake et al. ................. | 713/200 |
| 6,516,348 B1 | * | 2/2003 | MacFarlane et al. ........ | 709/224 |
| 6,546,415 B1 | * | 4/2003 | Park ........................... | 709/223 |
| 6,553,378 B1 | * | 4/2003 | Eschelbeck .................. | 707/10 |
| 2002/0087882 A1 | * | 7/2002 | Schneier et al. ............ | 713/201 |
| 2003/0051026 A1 | * | 3/2003 | Carter et al. ................ | 709/224 |

FOREIGN PATENT DOCUMENTS

| | | | |
|---|---|---|---|
| WO | 98/42103 | 9/1998 | ........... H04L/12/26 |
| WO | 00/08806 | 2/2000 | ........... H04L/12/26 |
| WO | 00/77687 | 12/2000 | ........... G06F/17/30 |
| WO | 01/31539 | 5/2001 | ........... G06F/17/60 |
| WO | 01/55862 | 8/2001 | ........... G06F/13/00 |
| WO | 01/84270 | 11/2001 | |

OTHER PUBLICATIONS

USPTO Office Action mailed in Jul. 2, 2004 in Appl. No. 10/029,686, filed Dec. 21, 2001.
USPTO Office Action mailed in Apr. 23, 2004 in Appl. No. 10/029,746, filed Dec. 21, 2001.
USPTO Office Action mailed in May 7, 2004 in Appl. No. 10/029,688, filed Dec. 21, 2001.

* cited by examiner

*Primary Examiner*—Patrice Winder
(74) *Attorney, Agent, or Firm*—Zilka-Kotab, PC; Christopher J. Hamaty

(57) ABSTRACT

A system, method and computer program product are provided for reporting on network analysis. Initially, network traffic information is collected utilizing a plurality of agents installed in computers distributed among a plurality of zones. Next, the network traffic information collected from the agents associated with each zone is received at separate controllers. Next, a report on the network traffic information is sent from one of the controllers to a computer coupled thereto via a network.

19 Claims, 28 Drawing Sheets

| OS | Description |
|---|---|
| Windows 2000 | Windows 2000 (Professional, Server, and Advanced Server) is a server and workstation operating system made by Microsoft that runs on Intel/Cyrix/AMD processors. |
| Windows NT | Windows NT, Windows NT Server, and Windows NT Server Enterprise Edition are server and workstation operating systems made by Microsoft that run on Intel/Cyrix/AMD processors, Intel 80x86, and DEC Alpha |
| MXS | Macintosh OS X (ten) Server is a desktop operating system based on Rhapsody. Macintosh OS X Server is being made by Apple Computer and will run on Motorola/IBM PowerPC. |
| OS/2 | OS/2 is a high performance desktop and high end operating system made by IBM that runs on Intel/Cyrix/AMD Pentium and Intel 80x86 |
| Linux | Linux is a free version of UNIX that runs on Intel/Cyrix/AMD Pentium, Intel 80x86, Motorola/IBM PowerPC, Motorola 680x0, Sun SPARC, SGI MIPS, DEC Alpha, HP PA-RISC, DEC VAX, ARM, API 1000+, and CL-PS7110. |
| Solaris | Solaris is a UNIX based operating system made by Sun Computers that runs on Sun SPARC and Intel/Cyrix/AMD Pentium. |
| HP-UX | HP-UX is a UNIX-based operating system made by Hewlett-Packard that runs on HP PA RISC. |
| OpenVMS | VMS is a high performance operating system made by Compaq/DEC that runs on DEC VAX. OpenVMS is an updated version of VMS. |
| Tru64 Unix | Tru64 Unix (formerly Digital UNIX) is a UNIX-based operating system made by Compaq/DEC for the DEC Alpha. |
| NetWare | Netware "is a dedicated network operating system" that runs on Intel/Cyrix/AMD Pentium, Intel 80486, and Intel 80386. |
| SCO OpenServer | SCO OpenServer is a UNIX-based operating system that runs on Intel/Cyrix/AMD processors. |
| AIX | AIX is IBM's version of UNIX. |

Figure 27

ENTERPRISE INTERFACE FOR NETWORK ANALYSIS REPORTING

FIELD OF THE INVENTION

The present invention relates to enterprise network analysis, and more particularly to reporting on enterprise network analysis.

BACKGROUND OF THE INVENTION

The marketplace for many companies has expanded from a national to a world marketplace. Large international companies have expanded into global companies and smaller companies have become international competitors. This market expansion has been driven by technology that has made both voice and data communication easier.

An enterprise network is a network for an enterprise, including multiple LANs, routers and servers, typically geographically separated. The networks of the enterprise network can be connected together over a wide area network. Enterprise network management that has evolved from the mainframe environment is still centered mainly on the operating systems and is mostly manual and resource intensive.

Numerous tools have been developed to aid in network management involving capacity planning, fault management, network monitoring, and performance measurement. Such tools are often referred to as network analyzers.

In general, a "network analyzer" is a program that monitors and analyzes network traffic, detecting bottlenecks and problems. Using this information, a network manager can keep traffic flowing efficiently. A network analyzer may also be used to capture data being transmitted on a network. The term "network analyzer" may further be used to describe a program that analyzes data other than network traffic. For example, a database can be analyzed for certain kinds of duplication. One example of a network analyzer is the SNIFFER ANALYZER™ device manufactured by NETWORK ASSOCIATES, INC™.

FIG. 1 shows a typical network analyzer 100 deployment attached to a single switch 102. As shown, several personal computers 104 are coupled to Server A 106 and Server B 108 via a switch array 110. This deployment sees broadcast and multicast traffic plus any unicast traffic to or from the network analyzer 100 only. In other words, the network analyzer 100 provides only a constrained view that is incapable of providing a complete picture of traffic between the personal computers and servers.

FIG. 2 depicts a network analyzer 200 deployment using spanning. This deployment sees all broadcast and multicast traffic, plus any unicast traffic to and from Server A. However, extra load has been added to the switch 202.

FIG. 3 depicts a network analyzer 300 deployment using a Virtual Local Area Network (VLAN) 302. This deployment sees broadcast and multicast traffic and any unicast traffic to or from the computers on VLAN 1, but the load on the switch 304 is now excessive.

At one time, repeated flat networks were the standard in an enterprise setting. Prior art network analyzer systems can only typically see one broadcast domain. This is due in large part to the fact that these systems were designed for flat repeated networks. Thus, such network analyzer systems function as an adequate solution in a "point" troubleshooting role, but do not scale to provide a true enterprise troubleshooting and monitoring capability.

Over time, there has been a steady migration away from flat networks towards fully switched networks. Given network topologies today, prior art network analyzer systems, as currently designed, cannot provide a complete solution that is capable of monitoring, detecting and troubleshooting problems on a corporate enterprise level. Even with monitoring modules on every switch, everything still cannot be seen, and there is a high cost associated with deploying this many monitoring modules.

This trend has spawned additional network analyzer functionality in an enterprise-wide fashion to allow company network managers to monitor their geographically dispersed networks from a central location. With this additional ability to analyze enterprise networks, there has been a coinciding need to report such analysis. Unfortunately, the differences between traditional network analyzer and enterprise network analyzer functionality spawn differing reporting requirements.

There is thus a need for techniques of reporting that are tailored to enterprise network analysis.

DISCLOSURE OF THE INVENTION

A system, method and computer program product are provided for reporting on network analysis. Initially, network traffic information is collected utilizing a plurality of agents installed in computers distributed among a plurality of zones. Next, the network traffic information collected from the agents associated with each zone is received at separate controllers. Next, a report on the network traffic information is sent from one of the controllers to a computer coupled thereto via a network.

In one embodiment, the report may be capable of being displayed on the computer utilizing a network browser. As an option, the network may include the Internet.

In another embodiment, a request may be made at one of the controllers for a report on the network traffic information corresponding to the zone associated with the controller. In response to the request, the report may be delivered. As an option, the report may include a network analyzer report including a plurality of objects. As yet another option, the objects may be organized in a tree representation.

BRIEF DESCRIPTION OF THE DRAWINGS

Prior Art

Prior Art

Prior Art

FIG. 27 shows a table that lists several operating systems that may be supported by one embodiment.

DESCRIPTION OF THE PREFERRED EMBODIMENTS

Figure 1:
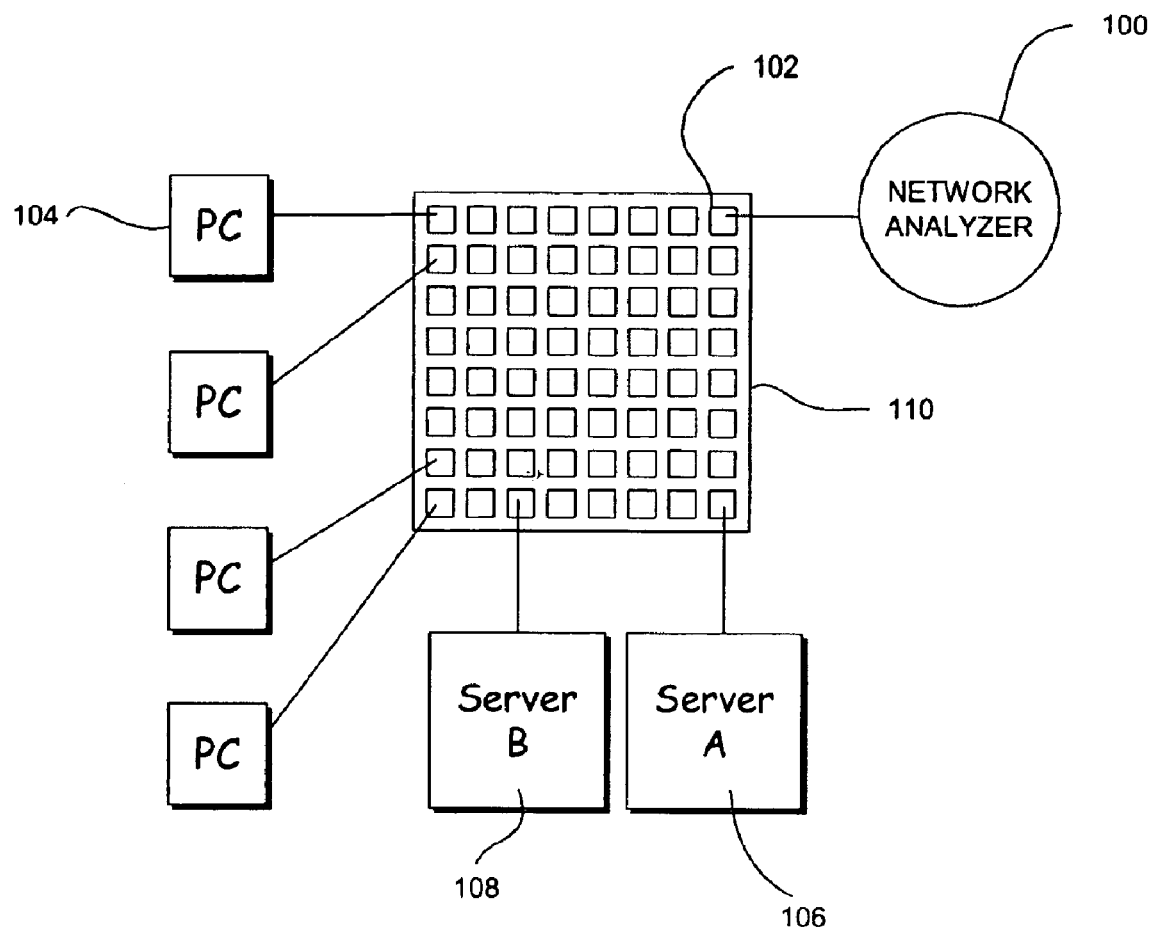
FIG. 1 shows a typical network analyzer deployment attached to a single switch.
Figure 2:
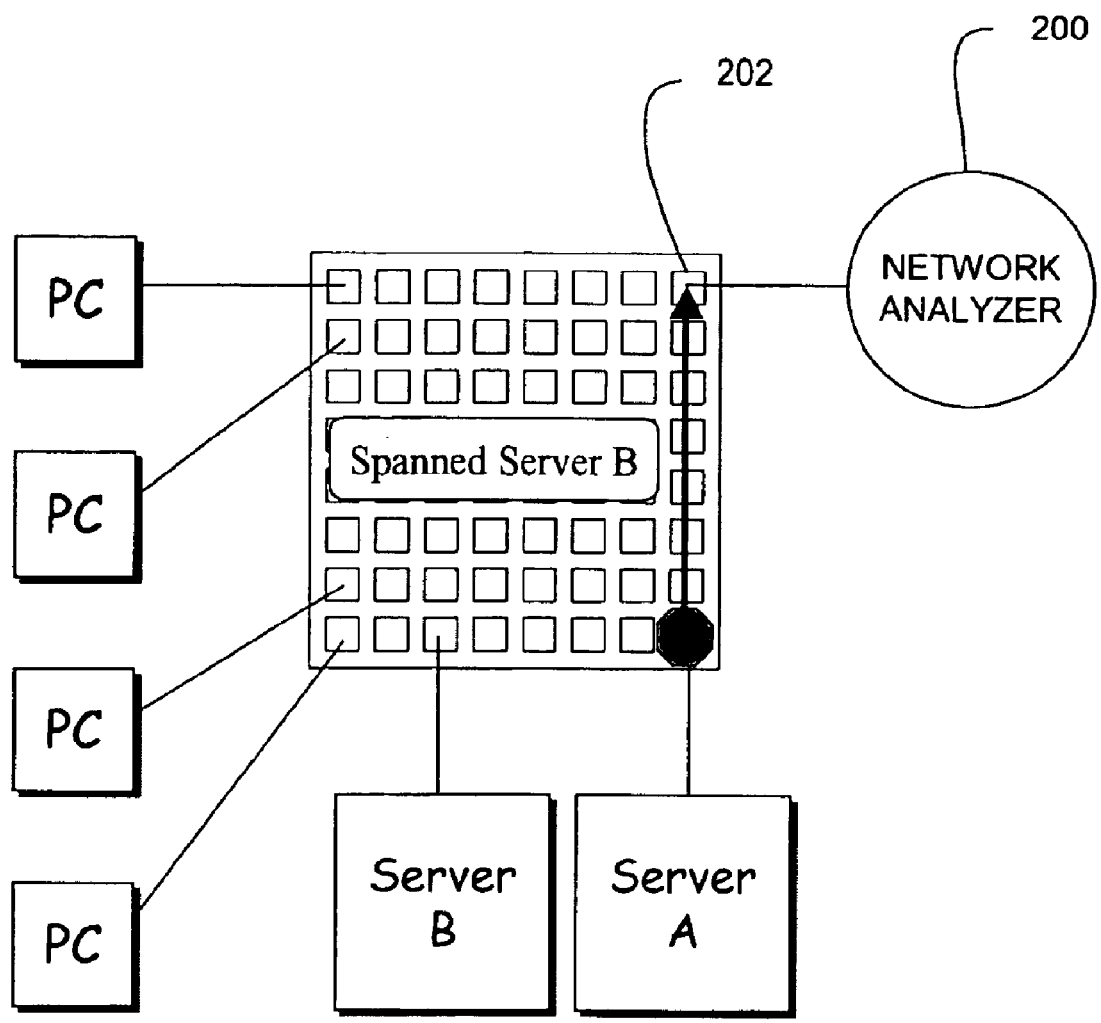
FIG. 2 depicts a network analyzer deployment using spanning.
Figure 3:
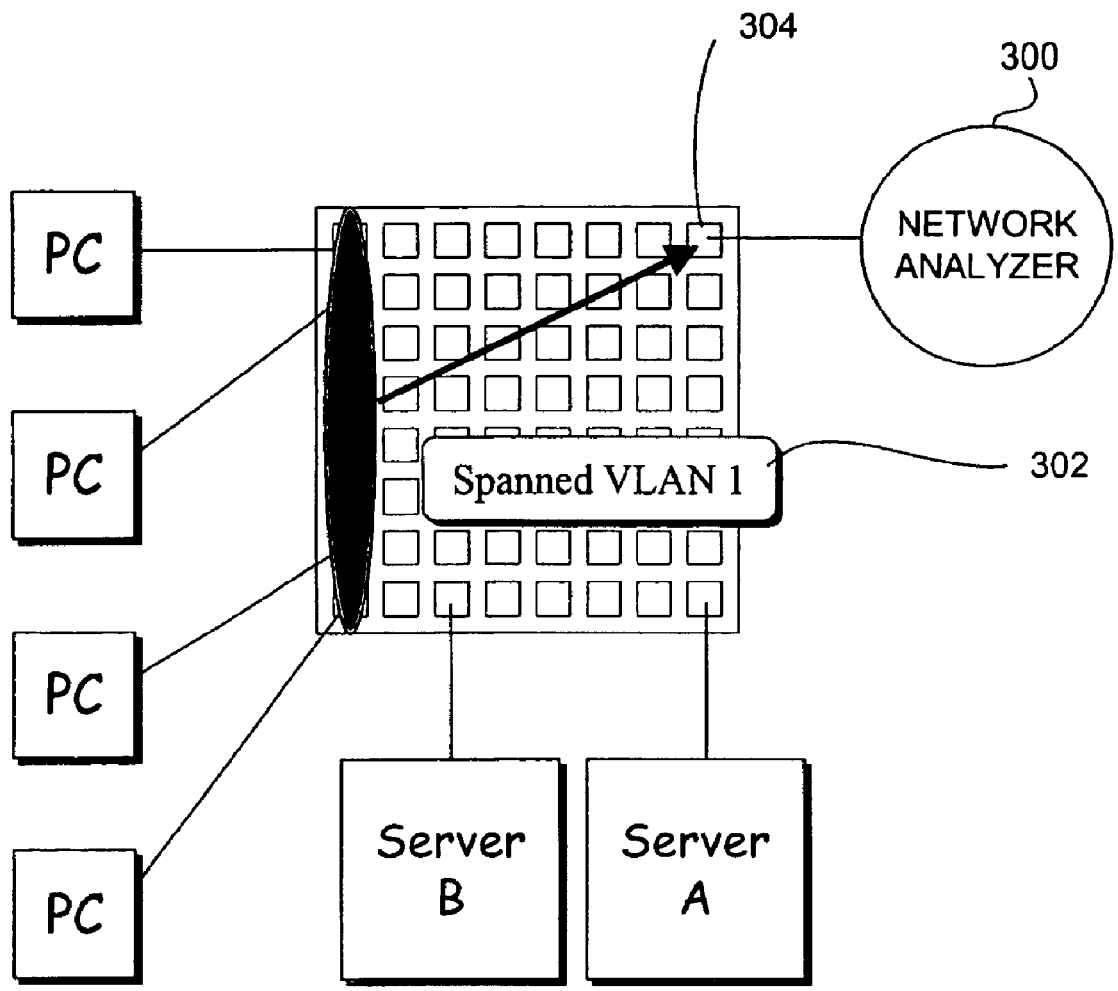
FIG. 3 depicts a network analyzer deployment using a Virtual Local Area Network (VLAN).
Figure 4:
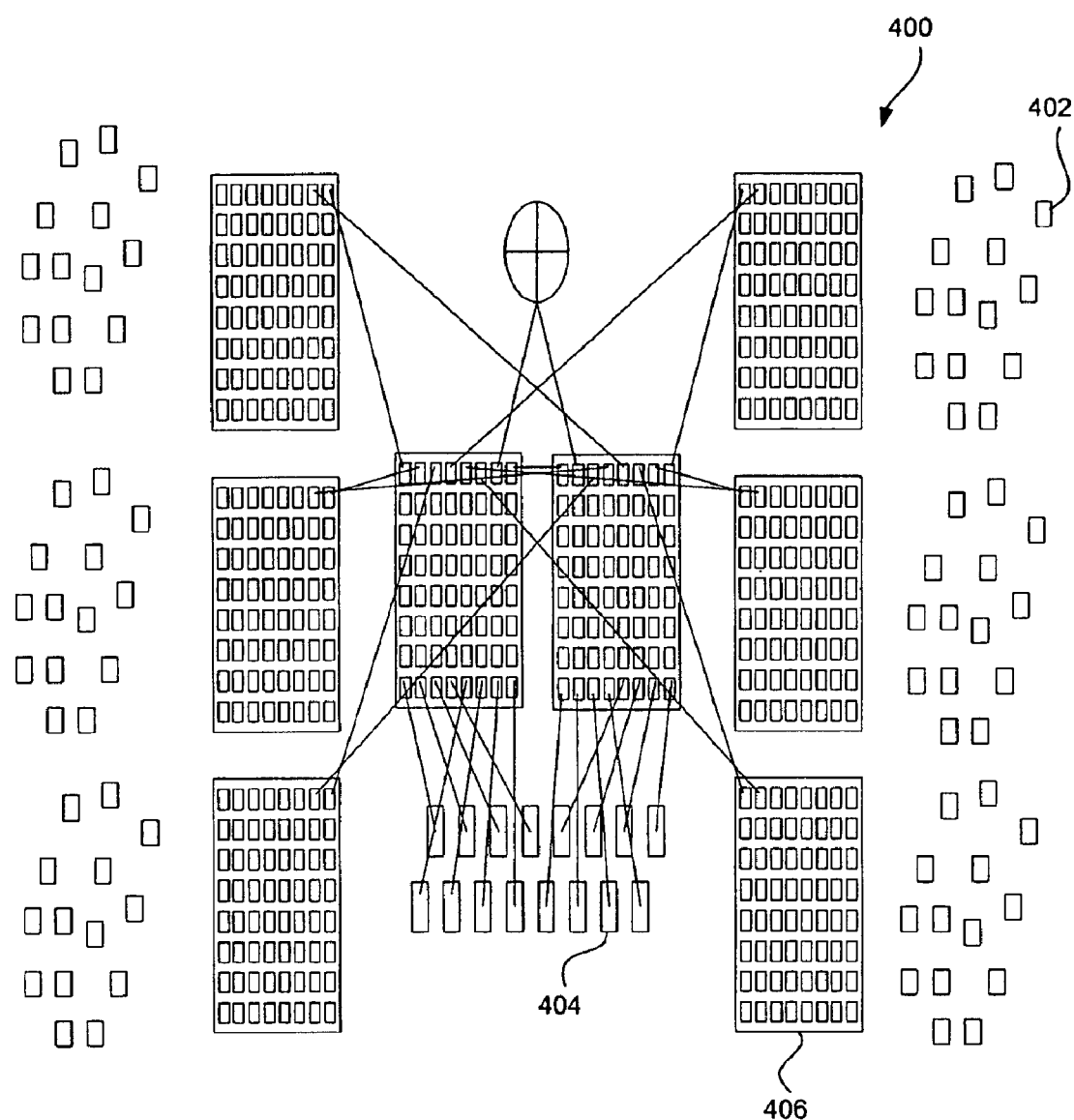
FIG. 4 illustrates an enterprise deployment node, in accordance with one embodiment.
Figure 5:
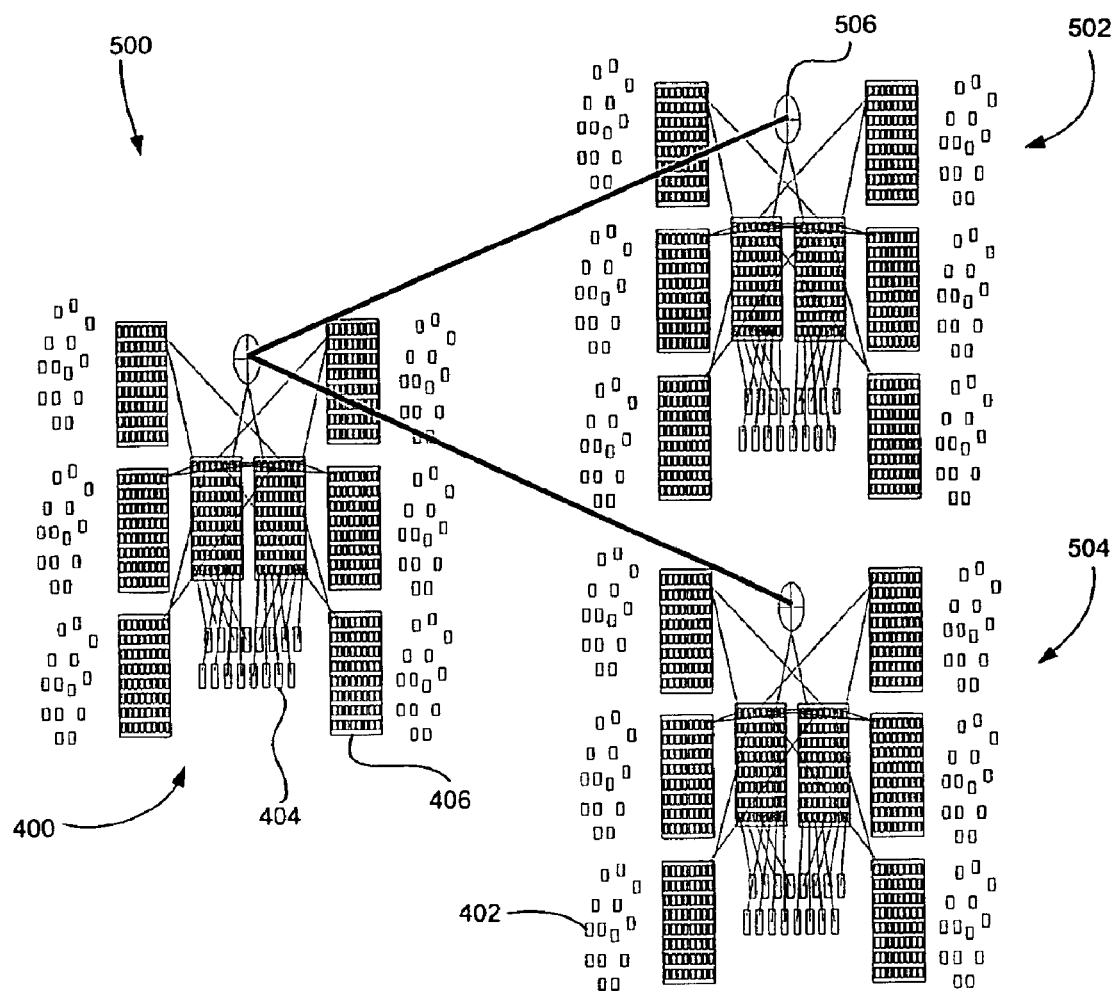
FIG. 5 shows a larger enterprise deployment encompassing the node of FIG. 4 and several other nodes communicating with each other via gateways.

FIGS. 1–3 illustrate the prior art FIG. 4 illustrates an enterprise deployment node 400, in accordance with one embodiment. As shown, a plurality of computers 402 communicates with servers 404 via switch arrays 406. Illustrative computers include desktop computers, lap-top computers, hand-held computers, and/or associated devices such as telephones, printers, network devices, or any other type of hardware or software logic. FIG. 5 shows a larger enterprise deployment 500 encompassing the node 400 of FIG. 4 and several other nodes 502, 504 communicating with each other via gateways 506.

Figure 6:
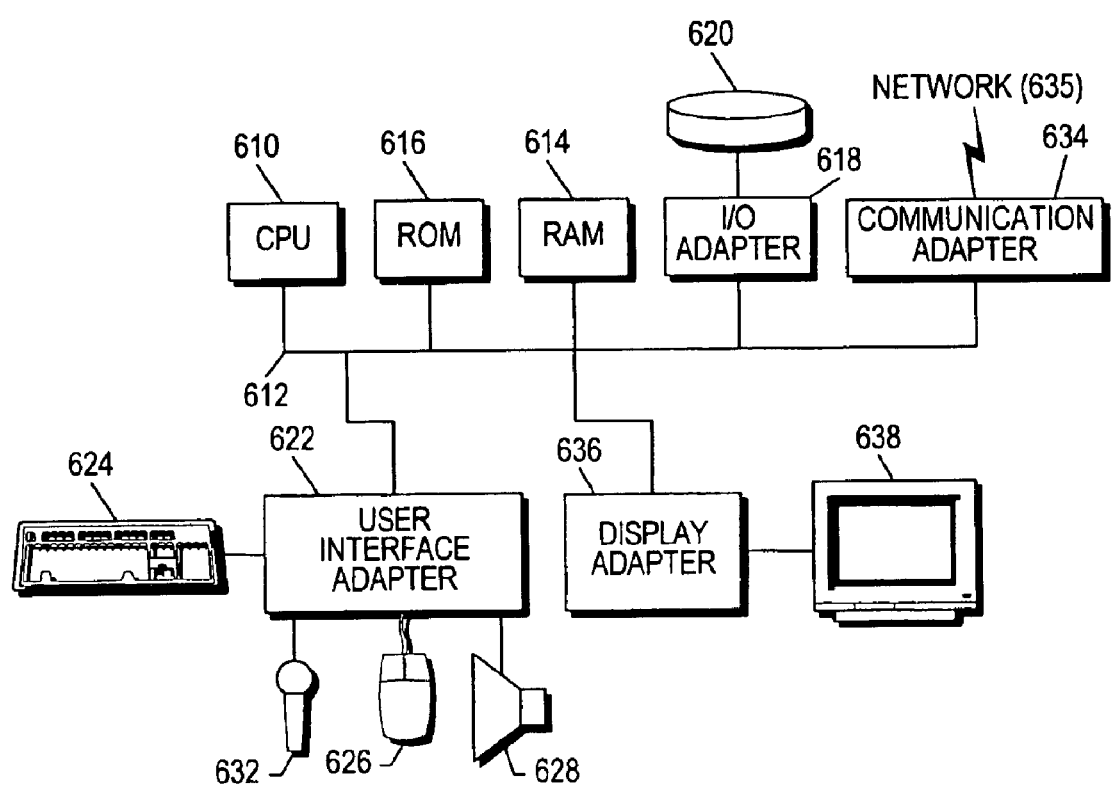
FIG. 6 shows a representative hardware environment that may be associated with the computers of FIGS. 4 and 5, in accordance with one embodiment.

FIG. 6 shows a representative hardware environment that may be associated with the computers 402 of FIGS. 4 and 5, in accordance with one embodiment. Such figure illustrates a typical hardware configuration of a workstation in accordance with one embodiment having a central processing unit 610, such as a microprocessor, and a number of other units interconnected via a system bus 612.

The workstation shown in FIG. 6 includes a Random Access Memory (RAM) 614, Read Only Memory (ROM) 616, an I/O adapter 618 for connecting peripheral devices such as disk storage units 620 to the bus 612, a user interface adapter 622 for connecting a keyboard 624, a mouse 626, a speaker 628, a microphone 632, and/or other user interface devices such as a touch screen and a digital camera (not shown) to the bus 612, communication adapter 634 for connecting the workstation to a communication network 635 (e.g., a data processing network) and a display adapter 636 for connecting the bus 612 to a display device 638.

The workstation may have resident thereon an operating system such as the Microsoft Windows NT or Windows 2000/XP Operating System (OS), the IBM OS/2 operating system, the MAC OS, or UNIX operating system. It will be appreciated that one embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

A network analyzing system according to one embodiment functions with large, fully-switched enterprise environments such as those shown in FIG. 5. The system also provides a solution that may fully scale to any size corporate network that is functionally complex with hierarchically extended relationships as depicted in FIG. 5. The system is also capable of monitoring and troubleshooting all nodes in a complex network.

As will soon become apparent, the system includes three major components that interact together to provide a cohesive solution that operates synergistically to achieve the features and concepts discussed herein. Table #1 illustrates three components of the present embodiment.

TABLE #1

Agent
Host controller
Zone Controller

Of course, any of the foregoing components may be used exclusive of the remaining components and/or combined with any additional desired components.

In the context of the present description, an agent 900 may refer to any computer program, hardware, etc. that is capable of collecting network traffic information involving a computer on which it is installed or associated. Further, network traffic information may refer to any information relating to communications involving the computer and a network coupled thereto.

Further, a host controller 1002 may refer to any computer program, hardware, etc. that is capable of collecting network traffic information from an agent 900 and/or controlling the same. Similarly, a zone controller 1602 may refer to any computer program, hardware, etc. that is capable of collecting network traffic information from a host controller 1002, agent 900, etc. and/or controlling the same. Of course, the foregoing components may optionally have additional capabilities that will be set forth in the following descriptions.

Figure 7:
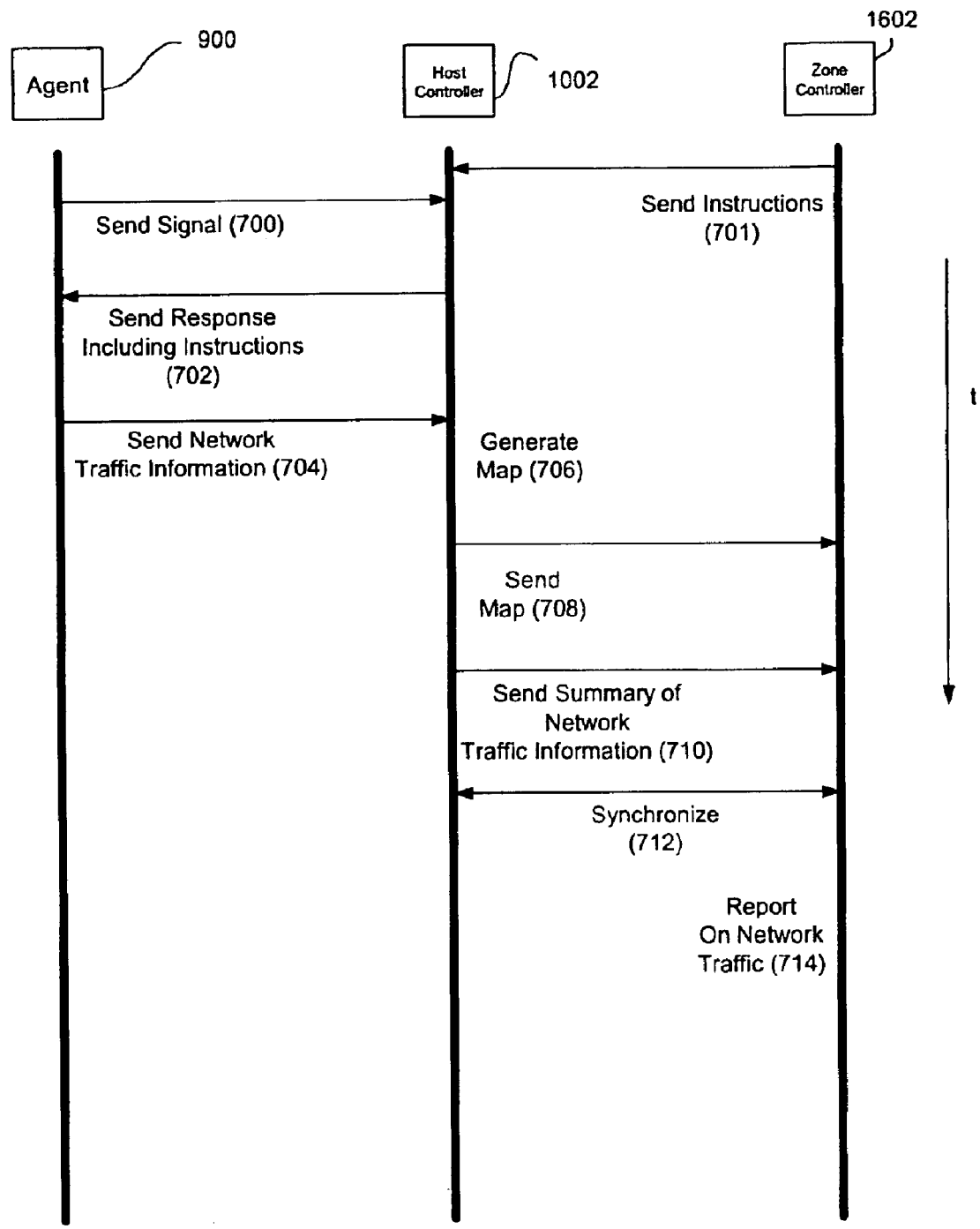
FIG. 7 illustrates an overview of a method for analyzing a network utilizing an agent, host controller, and zone controller, in accordance with one embodiment.

FIG. 7 illustrates an overview of a method for analyzing a network utilizing an agent 900, host controller 1002, and zone controller 1602, in accordance with one embodiment. As shown, the zone controller 1602 begins by sending instructions to the host controller 1002 in operation 701. As will soon become apparent, such instructions may take various forms to control the operation of the host controller 1002 and/or agent 900.

During use, the agent 900 sends a signal to the host controller 1002 in operation 700. This signal is designed to prompt the delivery of instructions from the host controller 1002 in operation 702. With these instructions in hand, the agent 900 is capable of collecting network traffic information in accordance with the instructions and send updates regarding the same in operation 704.

In one embodiment, each agent 900 may be adapted to collect network traffic information relating to at least one associated computer for a first predetermined time interval. Further, the agents 900 may collect the information in response to a demand received from the host controller 1002.

This network traffic information subsequently enables the host controller 1002 to generate a map 706. This network map may then be sent to the zone controller 1602 in operation 708 along with the updates on the network traffic information in operation 710. In one embodiment, the host controllers 1002 may be adapted for collecting the information from the agents 900 for a second predetermined time interval greater than the first predetermined time interval. Examples of such operation will be set forth hereinafter in greater detail.

The collection and updates involving the network traffic information may occur at predetermined times and during predetermined time intervals dictated by the zone controller 1602. To ensure accuracy throughout this process, the zone controller 1602 and host controller 1002 may be synchronized in operation 712.

To this end, the zone controller 1602 is adapted to report on the network traffic in operation 714. In particular, the zone controllers 1602 may be adapted for reporting on computers included in an associated zone utilizing the network traffic information and the map received from the host controllers 1002.

In use, the agent 900 may execute on any desired node. Such agent 900 is responsible for providing continuous monitoring and capturing on an associated computer.

The host controller 1002, on the other hand, is responsible for managing a plurality of the agents 900 within an assigned domain. The host controller 1002 then reports to a zone controller 1602 and mediates various node operations.

The zone controller 1602 may operate by itself or in a peer-to-peer relationship with other zone controllers 1602. The peer-to-peer capability allows for linear scalability to support any size enterprise network. It should be noted that the zone controller 1602 may not be necessary for smaller networks, where the host controller 1002 could be programmed to provide the desired functionality.

More information relating to each of the various components will now be set forth in greater detail.

Agent (900)

Figure 8:
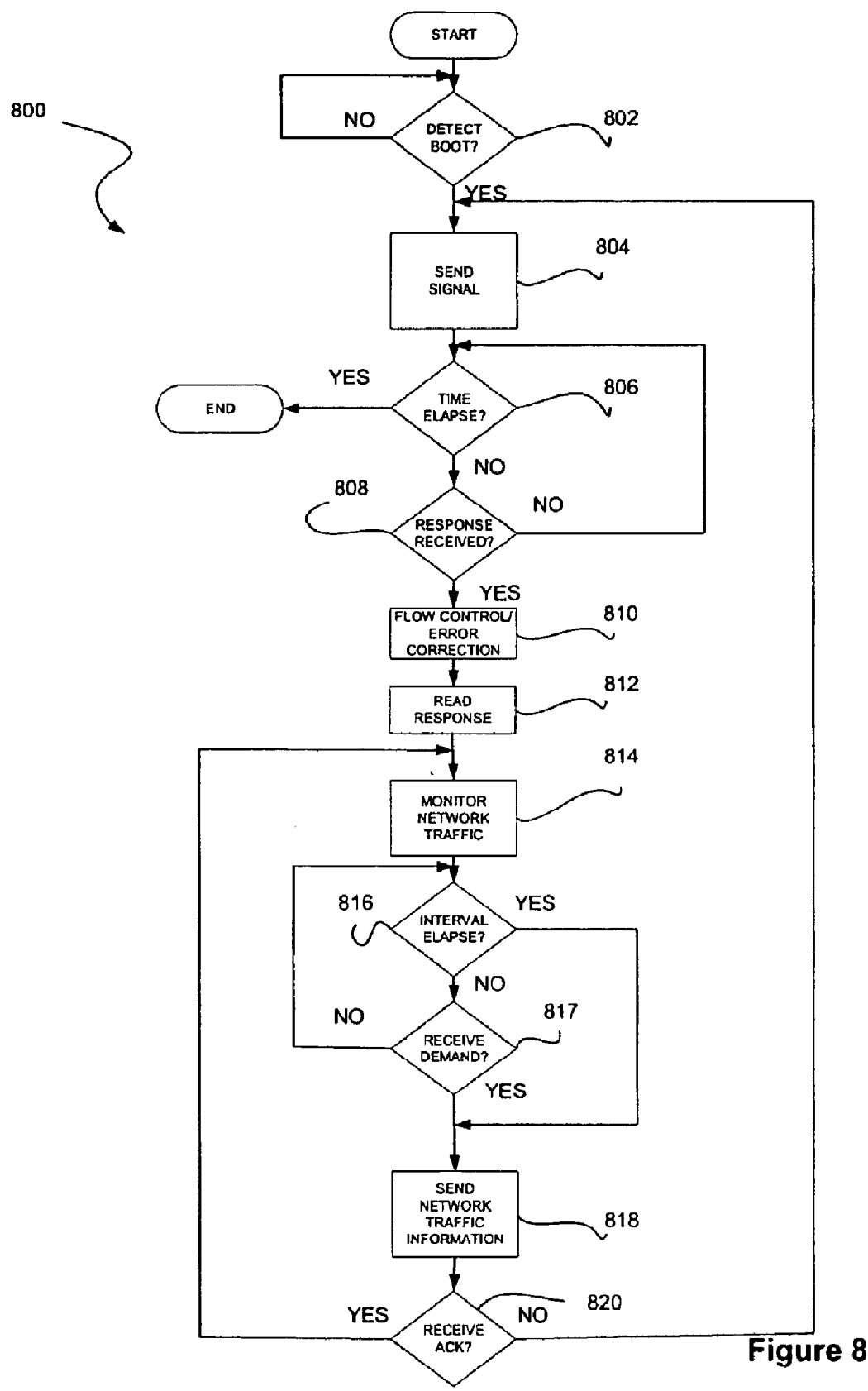
FIG. 8 illustrates a method for analyzing a network utilizing an agent, in accordance with one embodiment.

FIG. 8 illustrates a method 800 for analyzing a network utilizing an agent 900, in accordance with one embodiment. It should be noted that the present method 800 may be carried out in the context of the architecture set forth hereinabove. Of course, the following principles may be applied in any desired context.

Initially, in operation 802, a boot is detected on the computer utilizing the agent 900 associated therewith. This may be accomplished by detecting an indication from a booting operating system, or by any desired technique.

In response to the boot, the agent 900 is adapted for sending a signal to identify a host controller 1002 over a network. See operation 804. Such signal may include any type of network communication adapted for establishing communication with at least one host controller 1002.

The signal is repeatedly sent until the cessation of a predetermined time interval or a response is received from a host controller 1002 coupled to the agent 900 via the network. See decisions 806 and 808. Similar to the signal, the response may include any type of network communication from the host controller 1002 acknowledging communication with the agent 900.

Upon receiving the response from the host controller 1002, as determined in decision 808, flow control and error correction are established with the host controller 1002. See operation 810. Flow control refers to the management of data flow between computers or between nodes in a network so that the data may be handled at an efficient pace. Too much data arriving before a computer may handle it causes data overflow, meaning the data is either lost or must be retransmitted. On the other hand, error correction allows data that is being read or transmitted to be checked for errors and, when necessary, corrected on the fly.

In one embodiment, the agent 900 may communicate with the host controller 1002 utilizing a layer three encrypted protocol. In the context of Open Systems Interconnection (OSI), layer three protocol refers to communications at a network layer. Such network layer handles the routing of data (sending it in the right direction to the right destination on outgoing transmissions and receiving incoming transmissions at the packet level). In general, the network layer does routing and forwarding.

Next, in operation 812, the response from the host controller 1002 is read. As set forth earlier in the overview description in FIG. 7, such response may include instructions as to the manner in which the agent 900 collects the network traffic information, or any other desired control information. In other words, the network traffic involving the computer may be monitored per the instructions of the response. See operation 814. For example, the network traffic involving the computer may be monitored and information on such network traffic may be collected at predetermined time, for a predetermined interval, etc. See decision 816.

Such network traffic information may then be sent to the host controller 1002 in the form of periodic updates utilizing the agent 900. See operation 818. It should be noted that the period or interval during which the network traffic information is collected, and the period or interval associated with the transmission of the network traffic information may or may not be the same, per the instructions received from the host controller 1002. Further, the agent 900 may also collect and provide updates on network traffic information in response to a demand. See decision 817.

Once the network traffic information update is sent, the agent 900 may poll for the receipt of an acknowledgment from the identified host controller 1002, in response to the updates. See decision 820. It should be noted that operations 804 through 818 may be repeated upon the lack of receipt of an acknowledgement, as determined by decision 820.

While not shown, it should be noted that the agent 900 may be capable of filtering broadcast and multicast network traffic utilizing the agent 900. In the context of the present description, broadcast and multicast network traffic information includes communication between a single sender and multiple receivers on a network.

It should be noted that the agent 900 need not necessarily include a full blown network analyzer, nor provide a user interface or expert analysis. Rather, the agent 900 may merely keep a log of utilization and matrix data for a pre-specified period or interval of time such as 30 minutes, 60 minutes, etc. Further, the agent 900 may also capture data on demand.

As will soon become apparent, a bulk of the processing that takes place may be carried out on the zone controllers 1602, and at least to some extent on the host controllers 1002. The agent 900 may be designed as a small Terminate and Stay Resident (TSR)-type driver program that may be less than 1MB in size, and may run unobtrusively in the background to minimize drain on system resources. A TSR program is one that is set up to be loaded and then remain in computer memory so that it is quickly accessible when called.

The agent 900 may execute on multiple platforms, including Windows and Unix. The agents 900 may also be installed and managed via various commercially available tools such as Short Message Service (SMS) and login scripts, or rolled out as part of a corporate image. Further, the agents 900 may be deployed and/or removed on an "as-needed" basis as well as on a permanent basis.

As mentioned hereinabove, the agent 900 may include a very lightweight client with minimal impact on system resources. Further, the agent 900 may communicate with the host controller 1002, with all data staying local to the agent 900. The agent 900 may further provide services such as those listed in Table #2.

TABLE #2

Utilization
Matrix
Application Response Time (ART)
Pattern filtering
Capture with no expert A specific example of the operation of the agent 900 will now be set forth during reference to FIGS. 9–12. It should be noted that such example is set forth for illustrative purposes only, and should not be construed as limiting in any manner.

Figure 9:
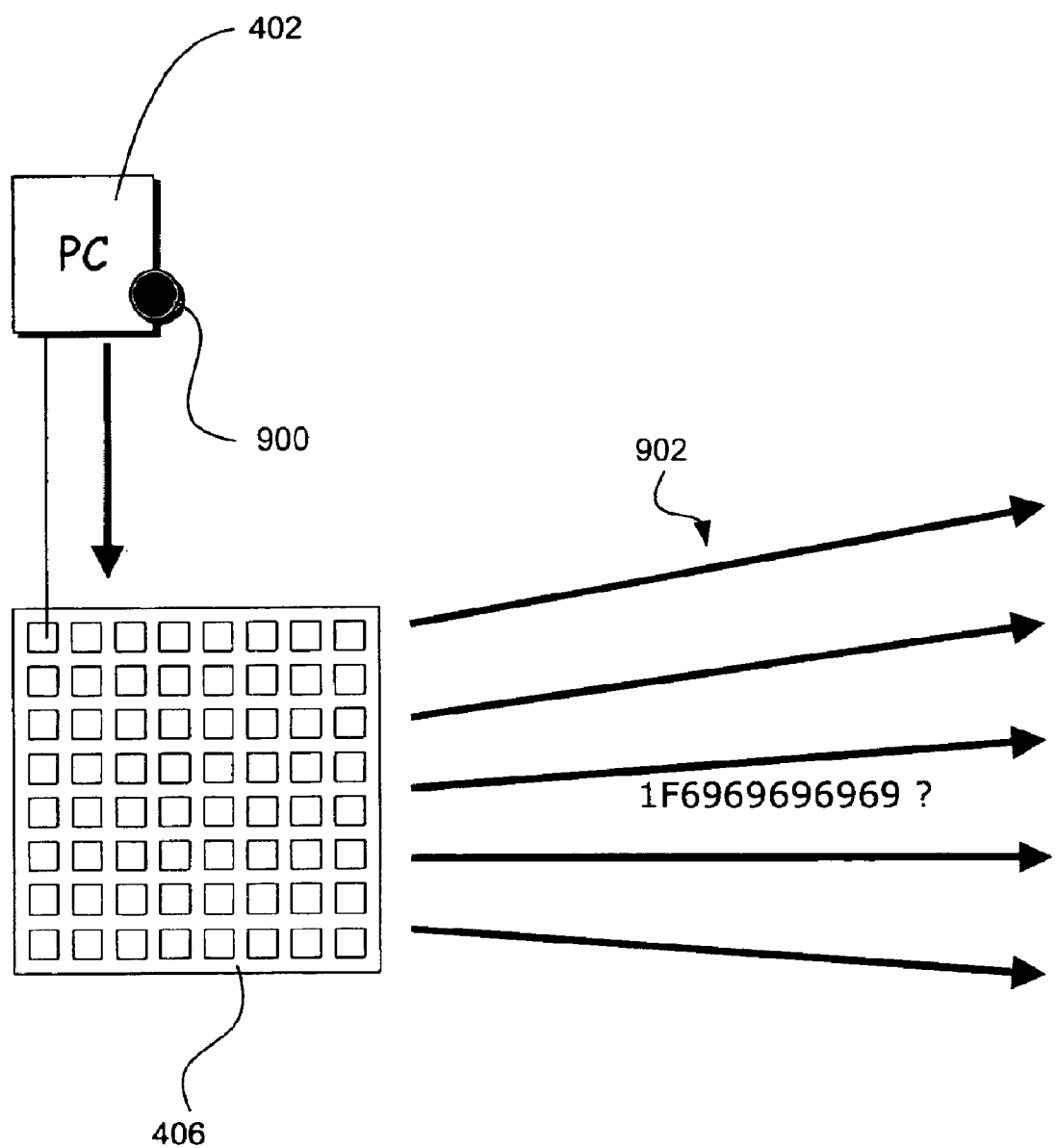
FIG. 9 illustrates the initialization of an agent according to one embodiment.

FIG. 9 illustrates the initialization of an agent 900 according to one embodiment. When the computer 402 running the agent 900 boots up, it sends a multicast 902 to a custom group address. A "looking for host controller" frame may be displayed on a graphical user interface on the computer 402 to indicate that initialization is being attempted. The multicast 902 is repeated until a host controller 1002 responds or a timer expires.

Figure 10:
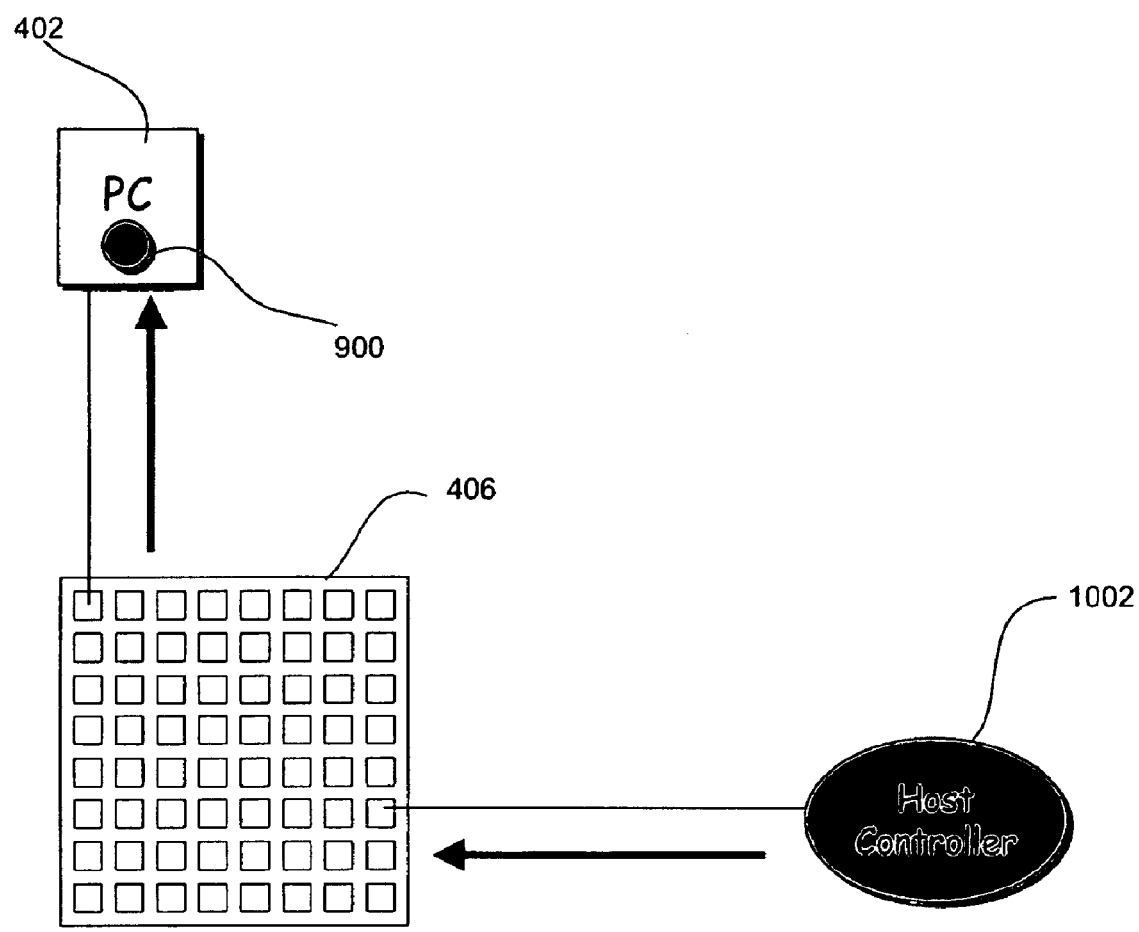
FIG. 10 depicts an agent-host initialization interaction upon initialization of the agent as set forth in FIG. 9.

FIG. 10 depicts an agent-host initialization interaction upon initialization of the agent 900 as set forth in FIG. 9. The host controller 1002 responds to the multicast 902 from the agent 900 with the current update interval settings and any desired configuration data. The communications between the host controller 1002 and the agent 900 include unicast communications. Further, Type II Logical Link Control (LLC) may be used to provide flow control and error correction.

If a predetermined number of updates at the set interval are unacknowledged by the host controller, the agent 900 may revert to multicast mode until contact is reestablished or the timer runs out.

Figure 11:
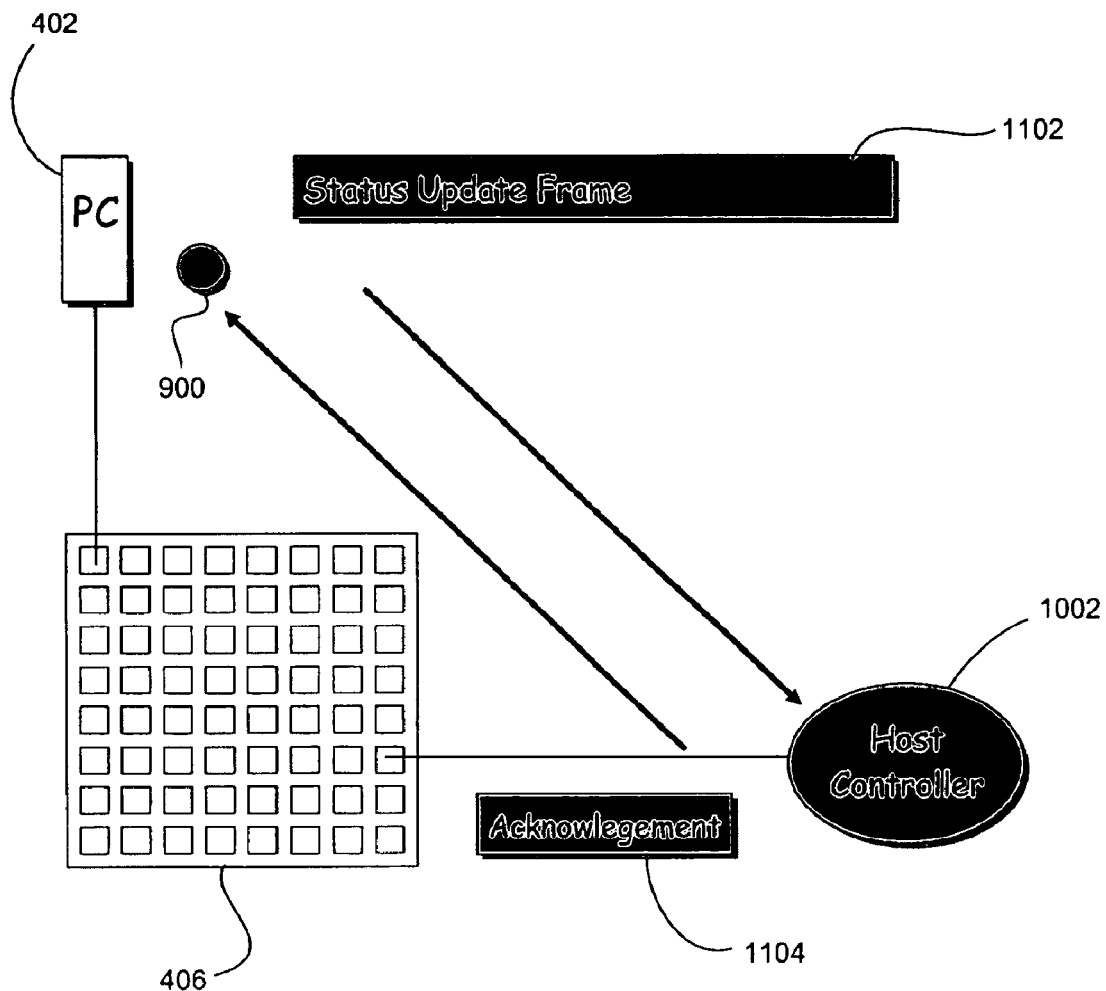
FIG. 11 shows an agent-host normal run-time interaction according to one embodiment.

FIG. 11 shows an agent-host normal run-time interaction according to one embodiment. At the configured interval, the agent 900 sends a status update frame 1102 directly to the host controller 1002, which acknowledges receipt of the frame 1102. The frame 1102 may include, for example, a Media Access Control (MAC) address, Internet Protocol (IP) address, computer name, utilization statistics, matrix statistics, ART statistics, line rate, etc. The host controller 1002 sends an acknowledgement 1104 back to the agent 900 upon receiving the frame 1102.

Figure 12:
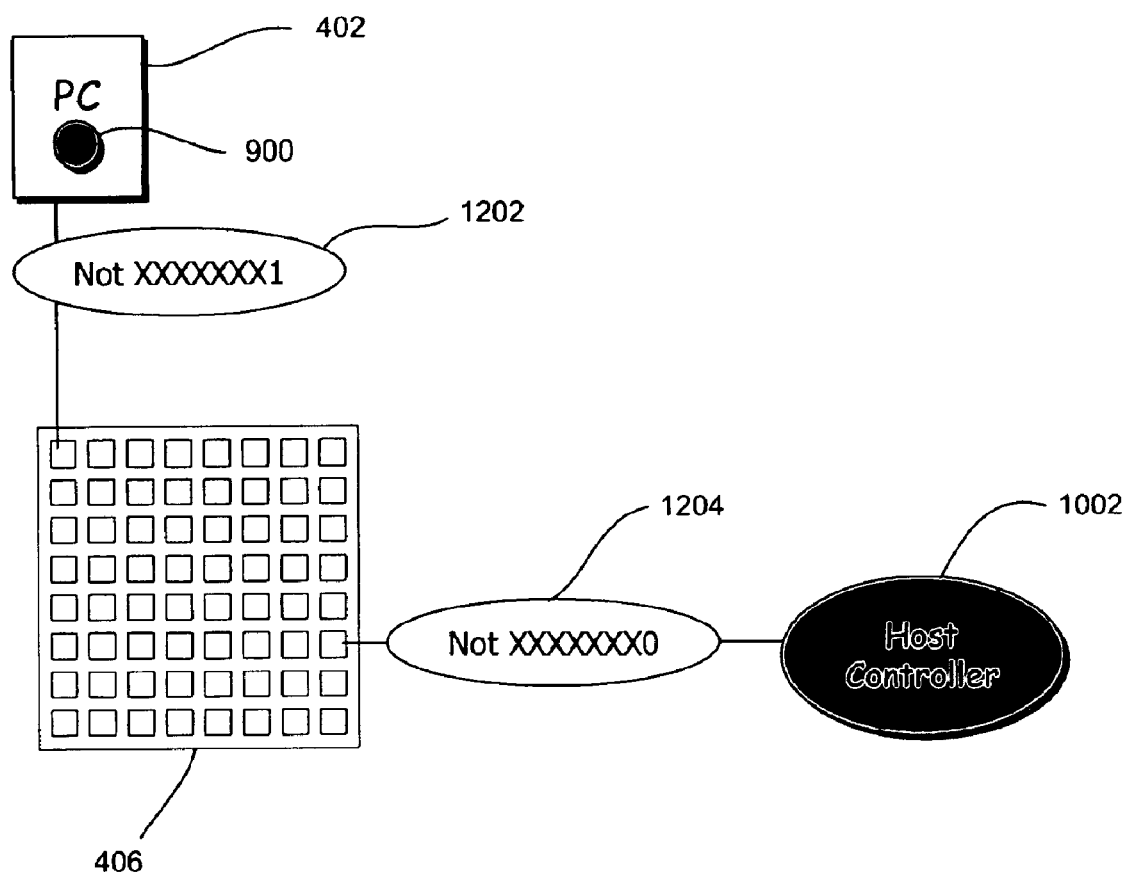
FIG. 12 illustrates another agent-host normal run-time interaction according to another embodiment.

FIG. 12 illustrates another agent-host normal run-time interaction according to an embodiment. As shown, the agent 900 filters out broadcast and multicast traffic to cut down on the load to the associated computer 402. See 1202. The host controller 1002 filters out all unicast traffic, thereby picking up all flooded traffic on the domain to ensure that utilization calculations are correct. See 1204.

The agents 900 may be deployed enterprise-wide. To this end, a technician does not have to be at or go out to the point of trouble. The entire enterprise may be viewed, analyzed, and diagnosed from a central point. Full historical data may be made available for post-event analysis. Further, by deploying agents 900, it is not necessary to transport physical network analyzers and install them at various points of interest in the enterprise because all data is constantly being collected and is readily available. More importantly, the present embodiment may provide guidance at a global level instead of the narrow viewpoint provided by prior art systems.

There are situations that exist in which putting an agent 900 on a network computer may not be possible. There are many network computers or devices that exist in which the possibility of placing an executable piece of software on that computer is not feasible. Some examples are listed in Table #3.

TABLE #3

Routers
Switches
Hubs
Cache Engines
Local Directors
Firewalls

In most of these situations, an agent 900 may not be required to physically exist on that particular computer. If an agent 900 exists on another computer that is connected to such a "non-agent capable" computer, then coverage may be attained.

One effect of placing agents 900 on computers connected to the non-agent capable computers is to provide complete coverage for the overwhelming majority of a corporate network. However, there could still be some special situations in which visibility into a particular node on a network cannot be obtained. In these special cases, it may be necessary to span a particular port in a switch, for example, in order to gain visibility.

An overall effect of the use of the agents 900 is that the foregoing type of scenario is reduced to a minimum. Additionally, the need to span within a switch is also significantly reduced such that it truly is an exception condition.

Host Controller (1002)

The operation of the host controller 1002 may be bifurcated into a first method for interfacing with the agents 900, and a second method for interfacing with the zone controllers 1602. Both of such methods will now be set forth separately below.

Figure 13:
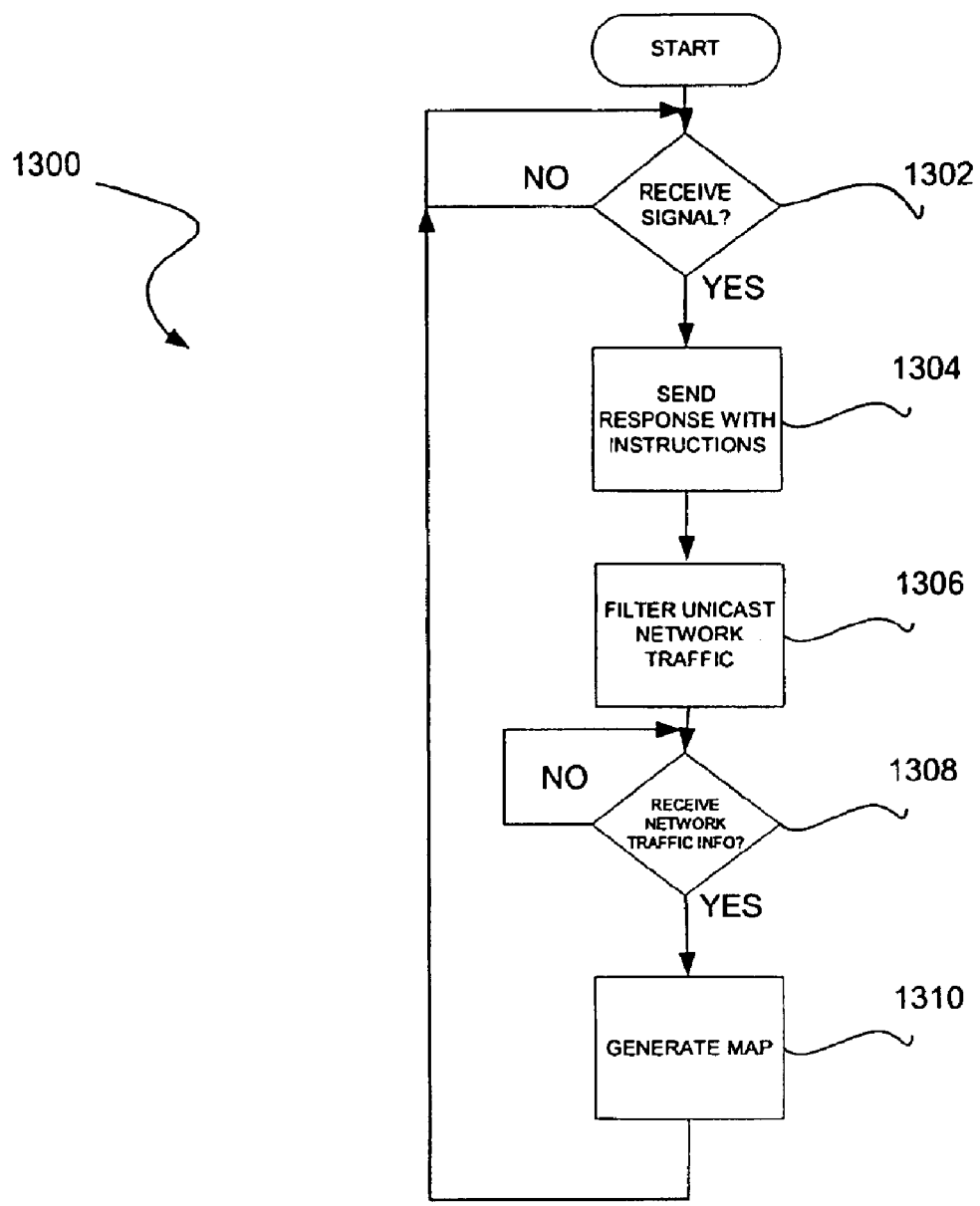
FIG. 13 illustrates a method for analyzing a network utilizing an agent/host controller interface.

FIG. 13 illustrates a method 1300 for analyzing a network utilizing an agent/host controller interface. It should be noted that the present method 1300 may be carried out in the context of the architecture and methods set forth hereinabove. Of course, the following principles may be applied in any desired context.

In decision 1302, it is determined whether a signal has been received from an agent 900. As mentioned earlier, such signal may include any type of network communication for establishing communication with at least one host controller 1002.

In response to the signal, the agent 900 is sent instructions in operation 1304. In particular, an interval setting and any desired configuration data may be sent. Thus, the agent 900 may transmit network traffic information in a manner that is based the configuration data, and at a time interval based on the interval setting. An example of such instructions will be set forth later.

In operation 1306, the host controller 1002 is adapted for filtering unicast network traffic. Unlike multicast network traffic, unicast is communication between a single sender and a single receiver over a network. As mentioned earlier, the host controller 1002 filters out unicast traffic, thereby picking up all flooded traffic on the domain to ensure that utilization calculations are correct.

After the agent 900 is instructed as to the appropriate operation, the host controller 1002 is equipped for receiving the network traffic information from the agent 900 per the interval setting. See decision 1308.

Still yet, in operation 1310, the host controller 1002 may generate a map based on the network traffic information. Such map may include any type of mapping or correlation among the computers and the network traffic information associated therewith.

Figure 14:
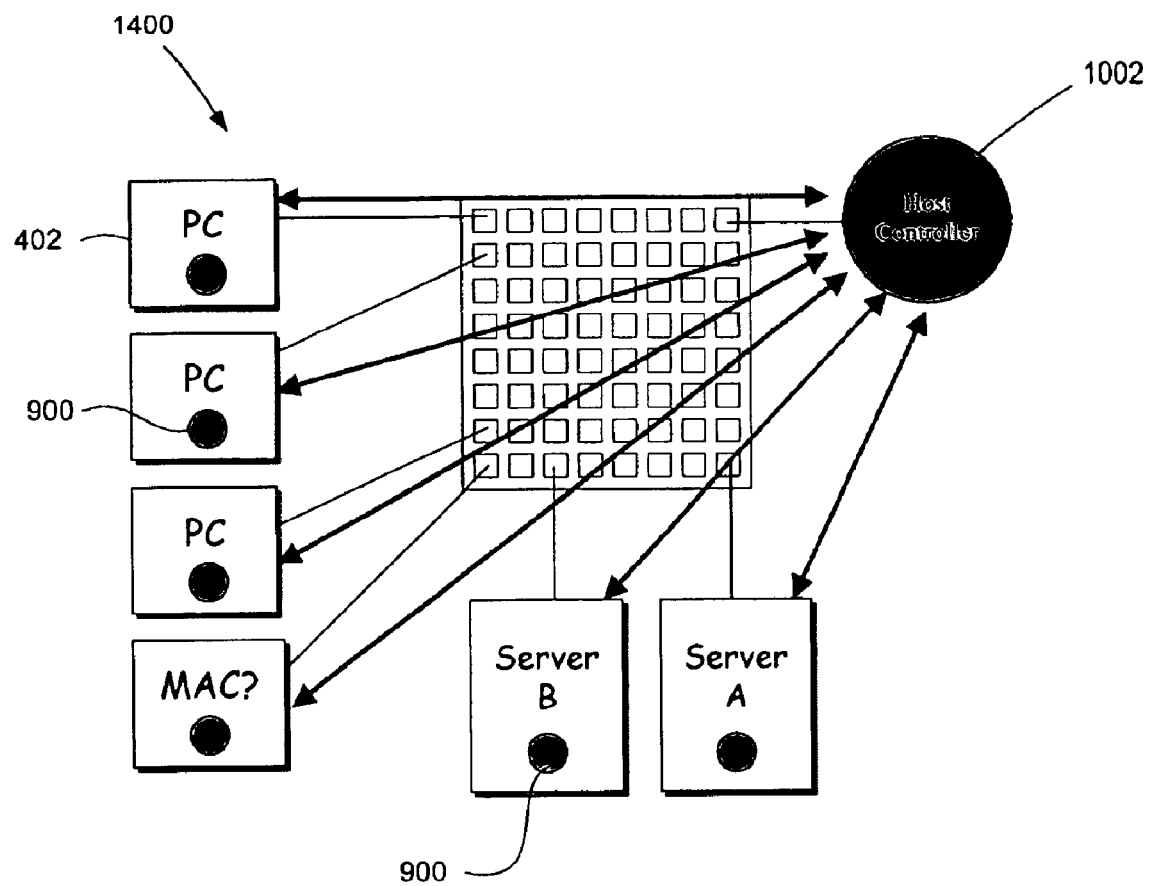
FIG. 14 depicts an architecture for host-agent monitoring according to one embodiment.

FIG. 14 depicts an architecture 1400 for host-agent monitoring according to one embodiment. The host controller 1002 communicates with and manages all agents 900 within an assigned domain. The host controller 1002 may mediate the registered agent processes, and buffer data for the zone controllers 1602. The host controller 1002 may also update the assigned zone controller 1602 at user configurable intervals. This role may be a low intensity task that requires minimal resources.

The host controller 1002 may run on a custom turnkey box for security reasons. The turnkey boxes may be created by modifying existing boxes that a user already has on hand. As an option, the computation requirements of the host controller 1002 may be minimal with no high-end hardware being necessary.

For security reasons, the host controller 1002 may utilize a custom protocol to communicate with the agents 900 and retains all associated data locally. For communication with the zone controller 1602, encrypted layer three communications may be used. In the context of OSI, layer three protocol refers to communications at a network layer. Such network layer handles the routing of data (sending it in the right direction to the right destination on outgoing transmissions and receiving incoming transmissions at the packet level). In general, the network layer does routing and forwarding.

The host controller 1002 maintains a configurably durational monitor history on each agent 900, such as a 24-hour history, and creates network maps based on the agent 900 updates. The host controller 1002 may also provide monitor updates to the zone controller 1602 at configurable intervals and mediate data capture on demand.

Figure 15:
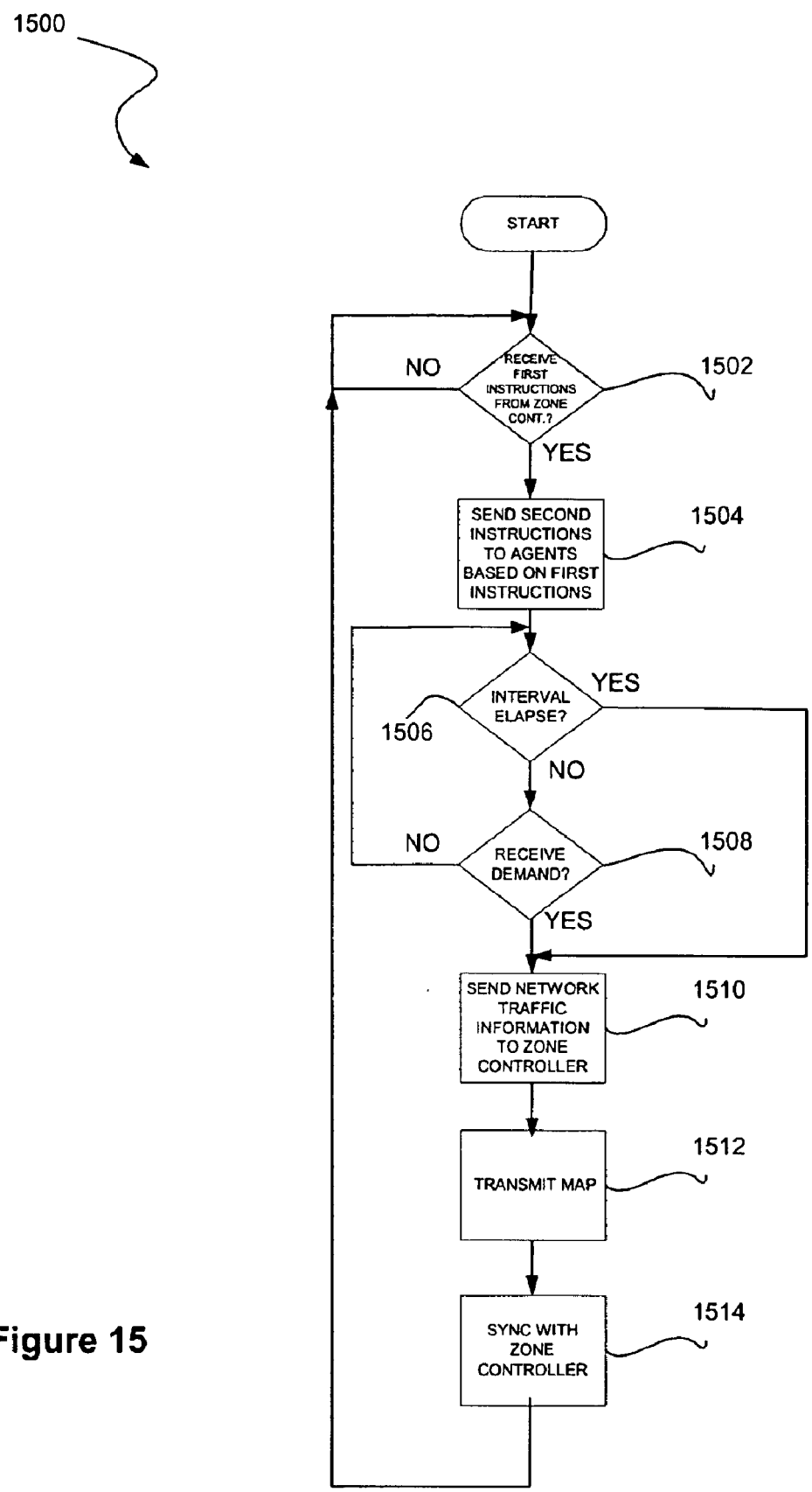
FIG. 15 illustrates a method for analyzing a network utilizing a host controller/zone controller interface.

FIG. 15 illustrates a method 1500 for analyzing a network utilizing a host controller/zone controller interface. Again, it should be noted that the present method 1500 may be carried out in the context of the architecture and methods set forth hereinabove. Of course, the following principles may be applied in any desired context.

First, it is determined decision 1502 as to whether instructions are received from a zone controller 1602. For example, such instructions may include an interval setting indicating a period with which network traffic information is to be sent to the zone controller 1602. Further, the instructions may include specific instructions dictating the manner in which the agents 900 should operate. In such case, a second set of instructions may be sent from the host controller 1002 to the agents 900 based on the instructions received in the previous operation. See operation 1504. As mentioned earlier, the second set of instructions may take the form of a response to a signal from the agents 900.

Next, the aforementioned interval setting is monitored and the host controller 1002 polls for the receipt of a demand over the network. Note decisions 1506 and 1508.

In response to the demand or the cessation of the predetermined interval, the network traffic information is transmitted to the zone controller 1602 in operation 1510.

Further, in operation 1512, a map is generated and transmitted to the zone controller 1602. Further, a clock between the host controller 1002 and the zone controller 1602 may be synchronized in operation 1514. This may facilitate the accuracy with which the network traffic information is transmitted. In particular, the host controller 1002 may be capable of transmitting the network traffic information at a designated time that is in synch with a clock of the zone controller 1602.

Figure 16:
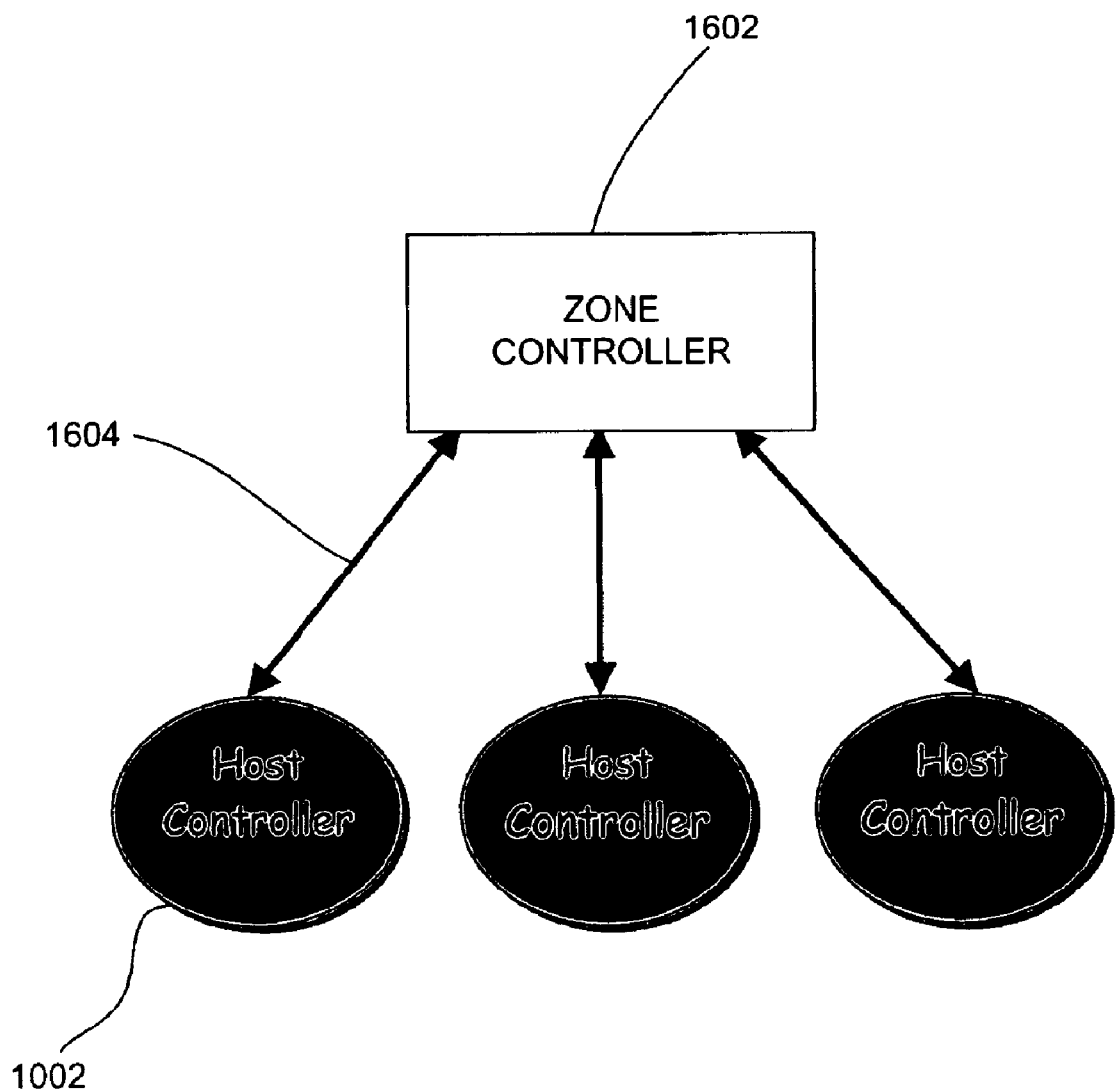
FIG. 16 depicts host controller-zone controller interactions according to one embodiment.

FIG. 16 depicts host controller-zone controller interactions according to one embodiment. At a set (configurable) interval (or on demand), each host controller 1002 sends a status update including a map and network traffic information to the zone controller 1602, as shown. During use, each host controller 1002 may maintain a secure layer three connection 1604 with the associated zone controller 1602.

Figure 17:
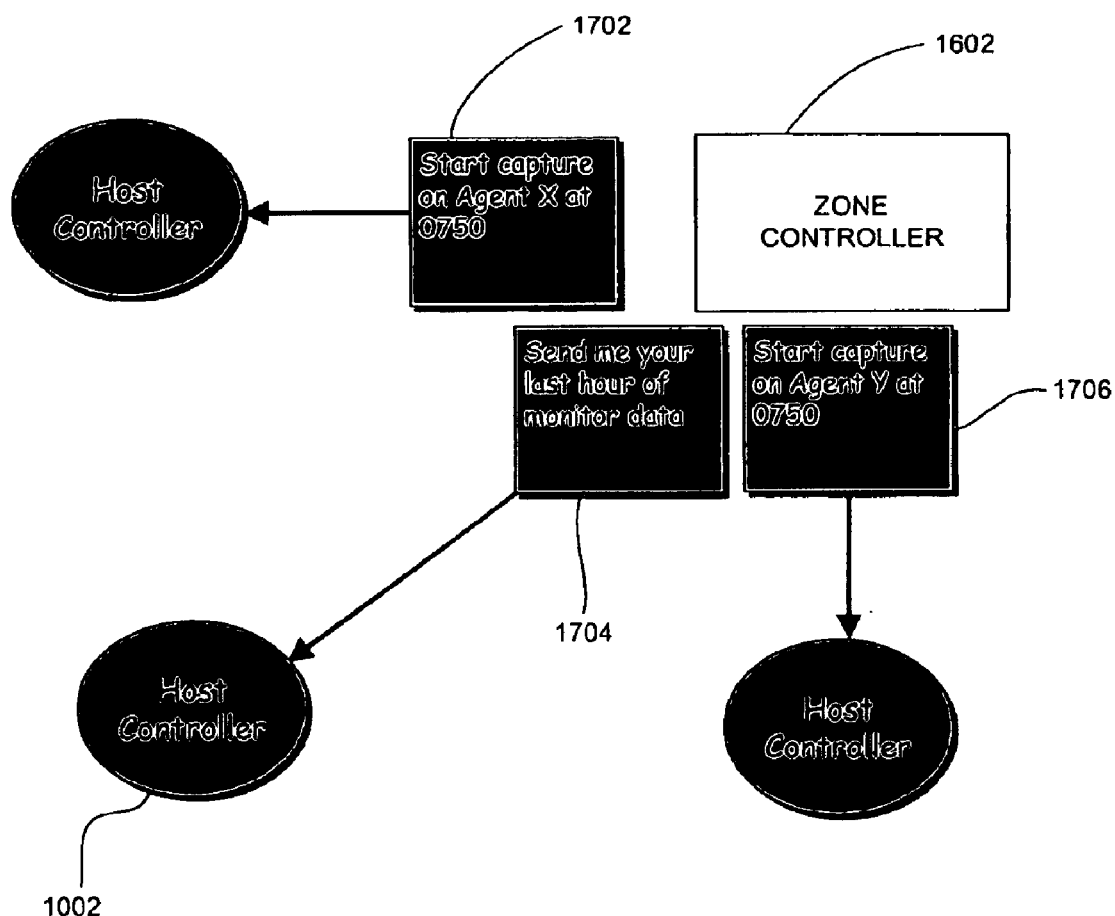
FIG. 17 shows an example of message transmission between the zone controllers and the host controllers.

FIG. 17 shows an example of message transmission between the zone controller 1602 and the host controllers 1002. As shown, a first message 1702 instructs a host controller 1002 to start capturing data from agent 900 X at 0750 hours. A second message 1704 to another host controller 1002 is a request for monitor data. A third message 1706 to yet another host controller 1002 instructs the host controller 1002 to start capturing data from agent 900 Y at 0750 hours. The messages may be for any purpose, including synchronizing clocks between the host controller 1002 and the zone controller.

Figure 18:
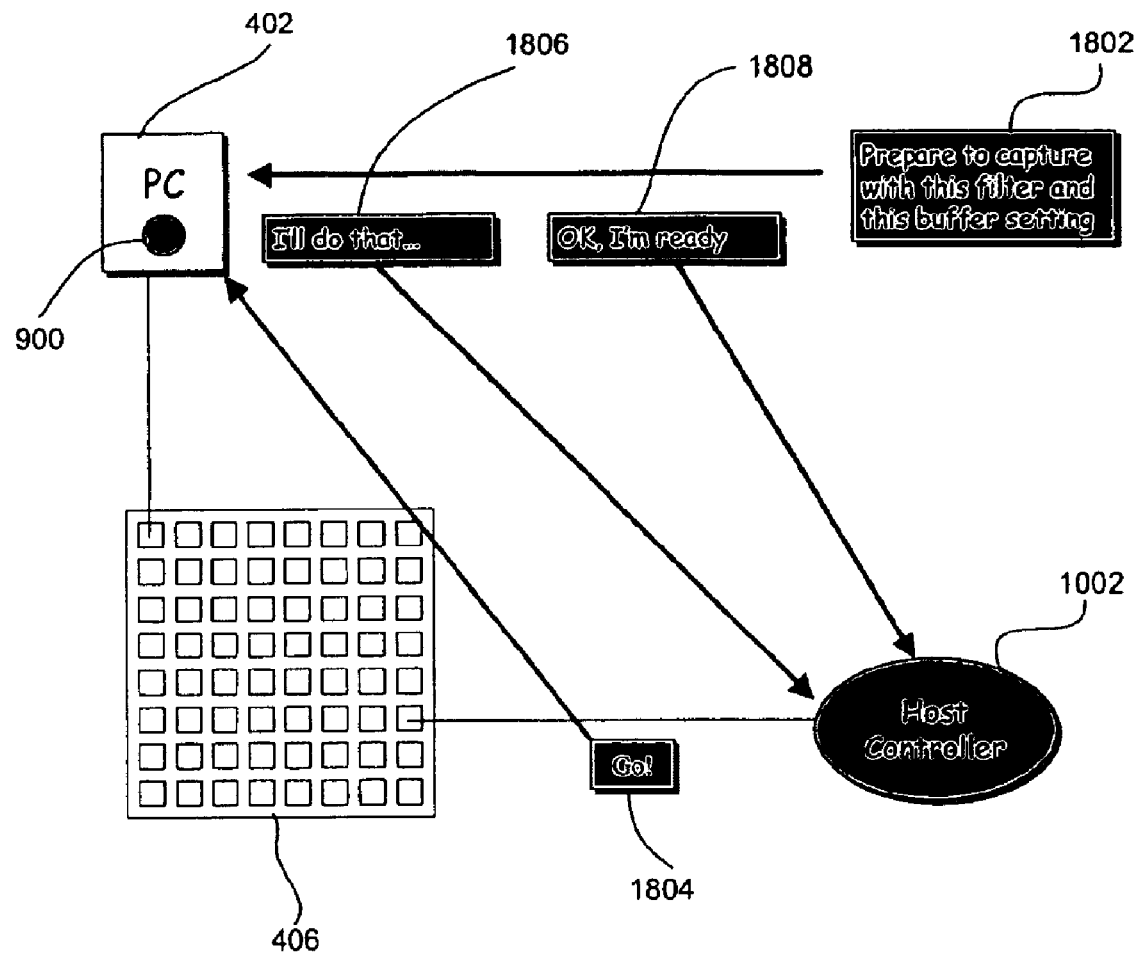
FIG. 18 depicts an example of messaging between a host controller and agent.

FIG. 18 depicts an example of messaging between a host controller 1002 and agent 900. In this example, the host controller 1002 sends a message 1802 to the agent 900, instructing the agent 900 to prepare to capture data. A trigger sequence follows transmission of the message 1802, where the host controller 1002 sends a message 1804 instructing the agent 900 to begin the capture. The agent 900 then sends a confirmation message 1806, and when prepared to begin the capture, sends another message 1808 to that effect.

Zone Controller (1602)

Figure 19:
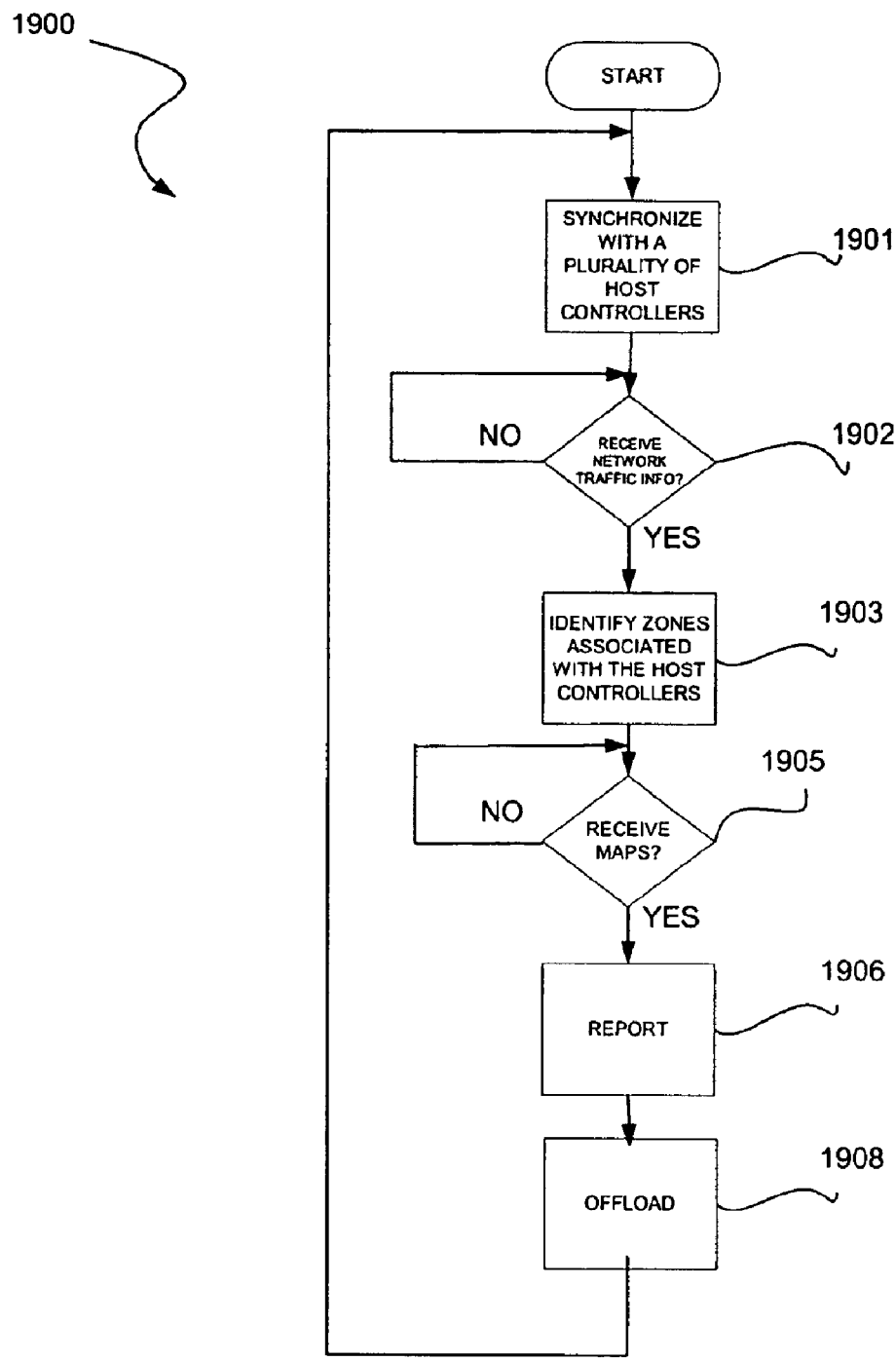
FIG. 19 illustrates a method for analyzing a network utilizing a zone controller.

FIG. 19 illustrates a method 1900 for analyzing a network utilizing a zone controller 1602. It should be noted that the present method 1900 may be carried out in the context of the architecture and methods set forth hereinabove. Of course, the following principles may be applied in any desired context.

Initially, a clock associated with the zone controller 1602 is synchronized with a plurality of host controllers 1002. See operation 1901. As mentioned earlier, this may facilitate the accuracy with which the network traffic information is transmitted and collected.

Next, network traffic information is received from the host controllers 1002 over a network. See decision 1902. Further, in operation 1903, a zone associated with each of the host controllers 1002 is identified. Still yet, in decision 1905, any of the aforementioned maps are also received from the host controllers 1002.

Utilizing the maps and a plurality of network-based interfaces, the network traffic information relating to each of the zones is reported. See operation 1906. More information regarding the network-based interfaces and the manner in which the network traffic information is reported will be set forth hereinafter in greater detail. As an option, the network traffic information may be offloaded to a database for subsequent reporting, archival purposes, and/or improving the efficiency of the overall system. See operation 1908.

Figure 20:
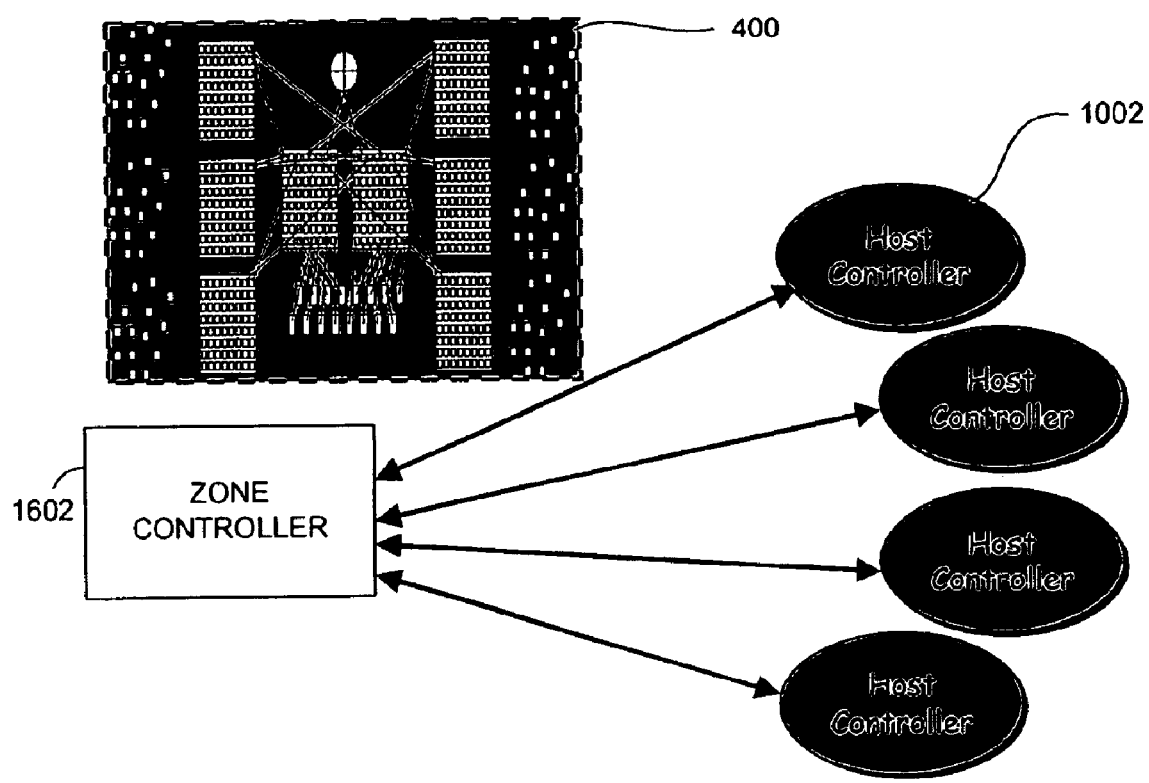
FIG. 20 illustrates an overview of the operation of the zone controller.
Figure 21:
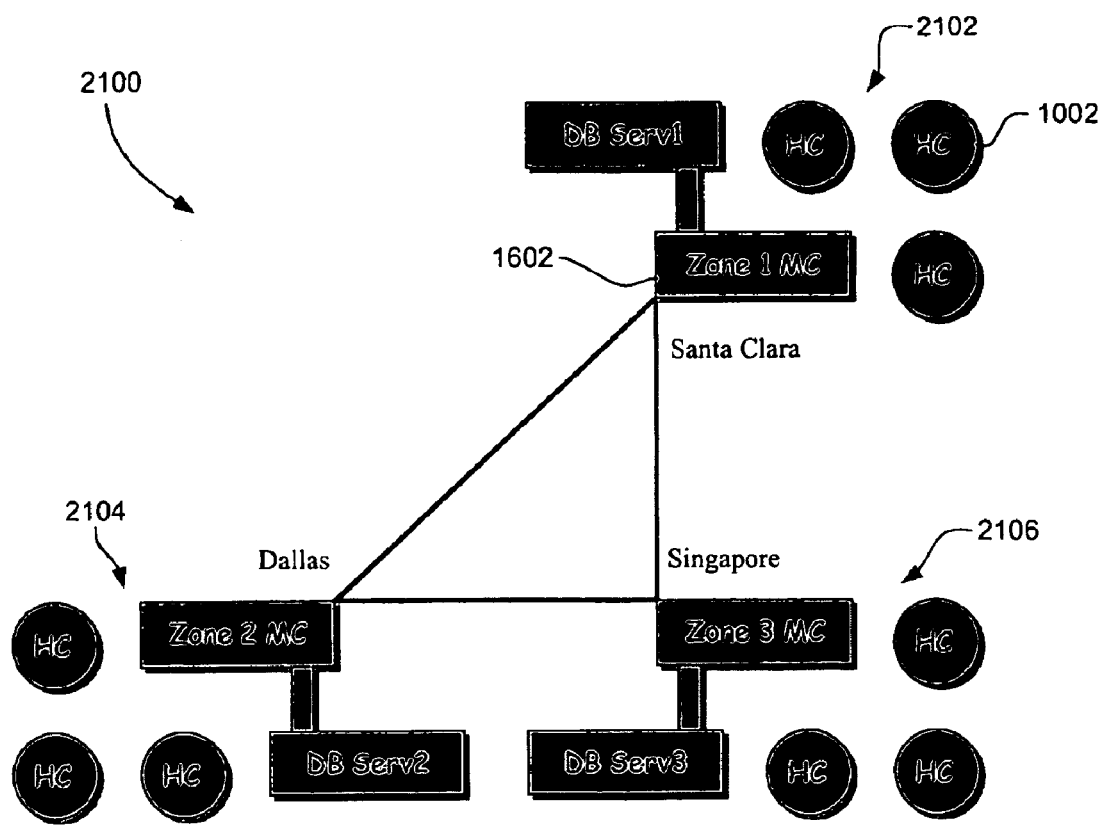
FIG. 21 shows a corporate network divided into Zone 1, Zone 2, and Zone 3.
Figure 22:
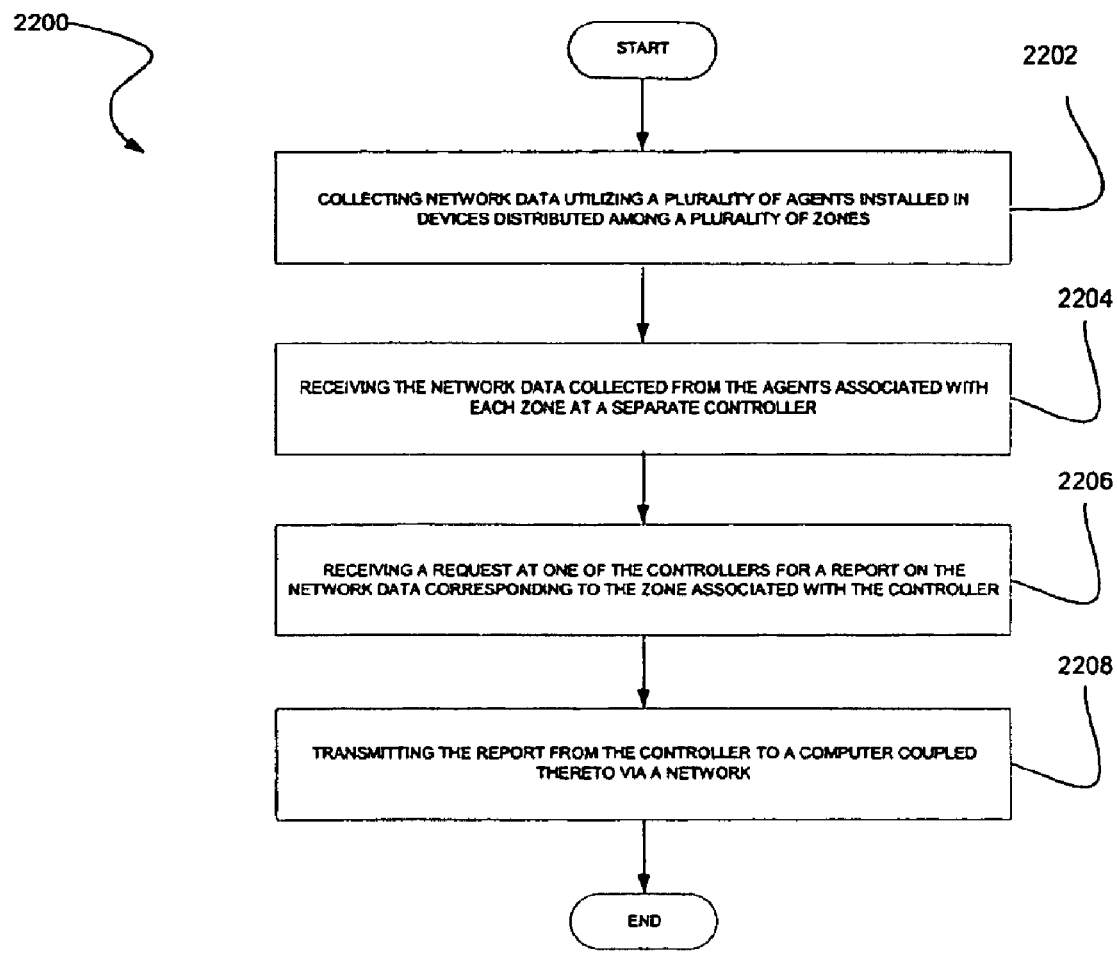
FIG. 22 illustrates a method for reporting on network analysis, in accordance with one embodiment.

A specific example of the operation of the zone controller 1602 will now be set forth during reference to FIGS. 20–22. It should be noted that such example is set forth for illustrative purposes only, and should not be construed as limiting in any manner.

FIG. 20 illustrates an overview of the zone controller 1602 operation. As shown, the zone controller 1602 receives data about a particular zone 400 from host controllers 1002. The zone controller 1602 assembles the data from the host controllers 1002 to create an entire enterprise picture of the corporate network. The zone controllers 1602 together may maintain a peer-to-peer architecture to ensure the system is infinitely scalable.

Further, the zone controller 1602 may provide web-based user interfaces for viewing reports and capturing data. A customizable, web-based user interface may allow users to view monitor data, generate reports, and capture data from each zone.

The zone controller 1602 may also be capable of offloading data to dedicated database servers to support long-term reporting needs. The zone controller 1602 may also process data from multiple segments with an enterprise network analyzer capability, as discussed below.

As an option, the zones may roughly correspond to physical sites. FIG. 21 shows a corporate network 2100 divided into Zone 1 2102, Zone 2 2104, and Zone 3 2106. The zone controllers 1602 of each zone collect data from the host controllers 1002 of their particular zones, and then communicate with each other to generate an overall picture of the network.

FIG. 22 illustrates a method 2200 for reporting on network analysis, in accordance with one embodiment. The present reporting method 2200 may be carried out in the context of the architecture and methods set forth hereinabove. If desired, the following principles may be applied in any other context.

Initially, network traffic information is collected utilizing a plurality of agents 900 installed in computers distributed among a plurality of zones. See operation 2202. Next, in operation 2204, the network traffic information may be collected from the agents 900 associated with each zone at a separate controller. In other words, the agents 900 may be organized based on a physical zone in which it resides. Further, a separate controller may be dedicated to each zone. It should be noted that the host controllers 1002 may optionally be implemented based on a size of the zones, desires of the user, etc.

Next, in operation 2206, a request is received at one of the controllers for a report on the network traffic information corresponding to the zone associated with the controller. Further, the report is transmitted from the controller to a computer coupled thereto via a network. See operation 2208. In use, the report is capable of being displayed on a computer utilizing a network browser (i.e. MS EXPLORER®, NETSCAPE NAVIGATOR®, etc.) Further, various tools such as a network analyzer may be used to enhance the reporting aspect of the present embodiment.

Enterprise Network Analyzer

A network analyzer may be used to perform network analysis and make decisions on data that is global to an entire corporate enterprise network. The network analyzer may be able to concurrently manage, diagnose problems, and identify symptoms across the enterprise network. Further, the network analyzer may provide guidance and recommendations at an enterprise level. One example of a network analyzer that may be used in the context of the present embodiment is the SNIFFER ANALYZER™ device manufactured by NETWORK ASSOCIATES, INC™. Of course, any desired type of network analyzer may be used per the desires of the user.

Figure 23:
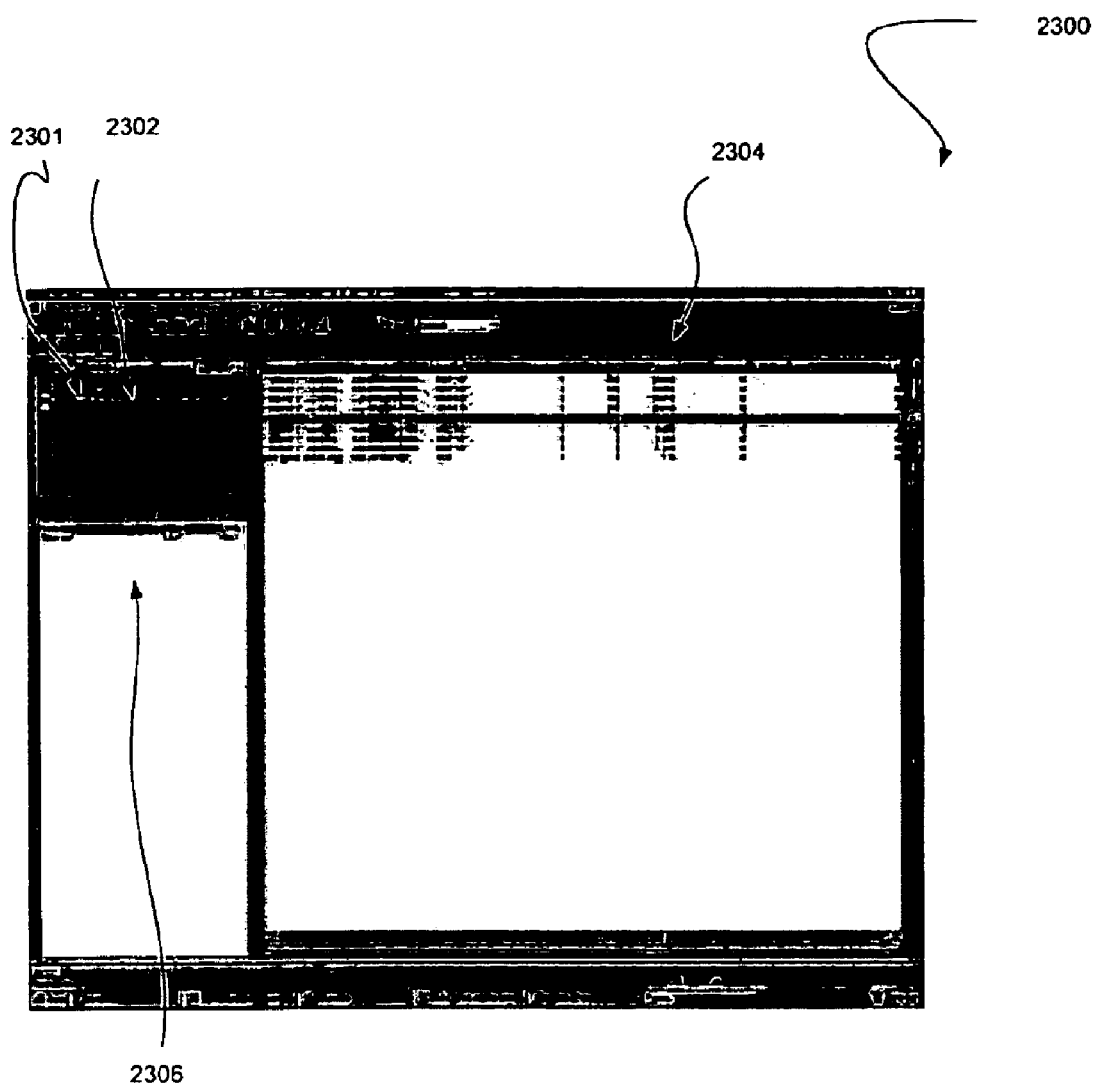
FIG. 23 shows a graphical user interface for displaying various objects associated with the network traffic information collected by the agents, host controllers, zone controllers, etc.

FIG. 23 shows a graphical user interface 2300 for displaying various objects associated with the network traffic information collected by the agents 900, host controllers 1002, zone controllers 1602, etc. In the context of the present description, an object may refer to a buffer, memory, a table or any other set of data that is associated with a specific communication protocol layer (i.e. connection, session, application, etc.). Of course, various other layers may be represented by other objects.

While the present graphical user interface 2300 shows a plurality of voice-specific protocols, any type of protocol may be monitored. The instant graphical user interface 2300 is disclosed for illustrative purposes only, and should not be construed as limiting in any manner.

As shown, a plurality of groups of objects 2301 is displayed in a first window 2302, in accordance with one embodiment. As an option, upon the selection of one of the groups of objects 2301, a second window 2304 may be shown which includes the particular objects associated with the chosen group of objects 2301.

This second window 2304 may further include information associated with each listed object. Such information may include, but is not limited to a first network station, a second network station, a protocol associated with the objects, a number of packets in the objects, and a size of the objects.

Also included is a third window 2306 for displaying summary information relating to the groups of objects 2301 associated with particular protocols. In other words, a total number of packets and a total size of all objects in a particular group associated with particular protocols are shown in the third window 2306.

At any desired time, a selection of one of the objects in the second window 2304 may be received from the user. Protocol-specific packets associated with the selected object are then filtered and displayed upon receipt of the selection.

Figure 24:
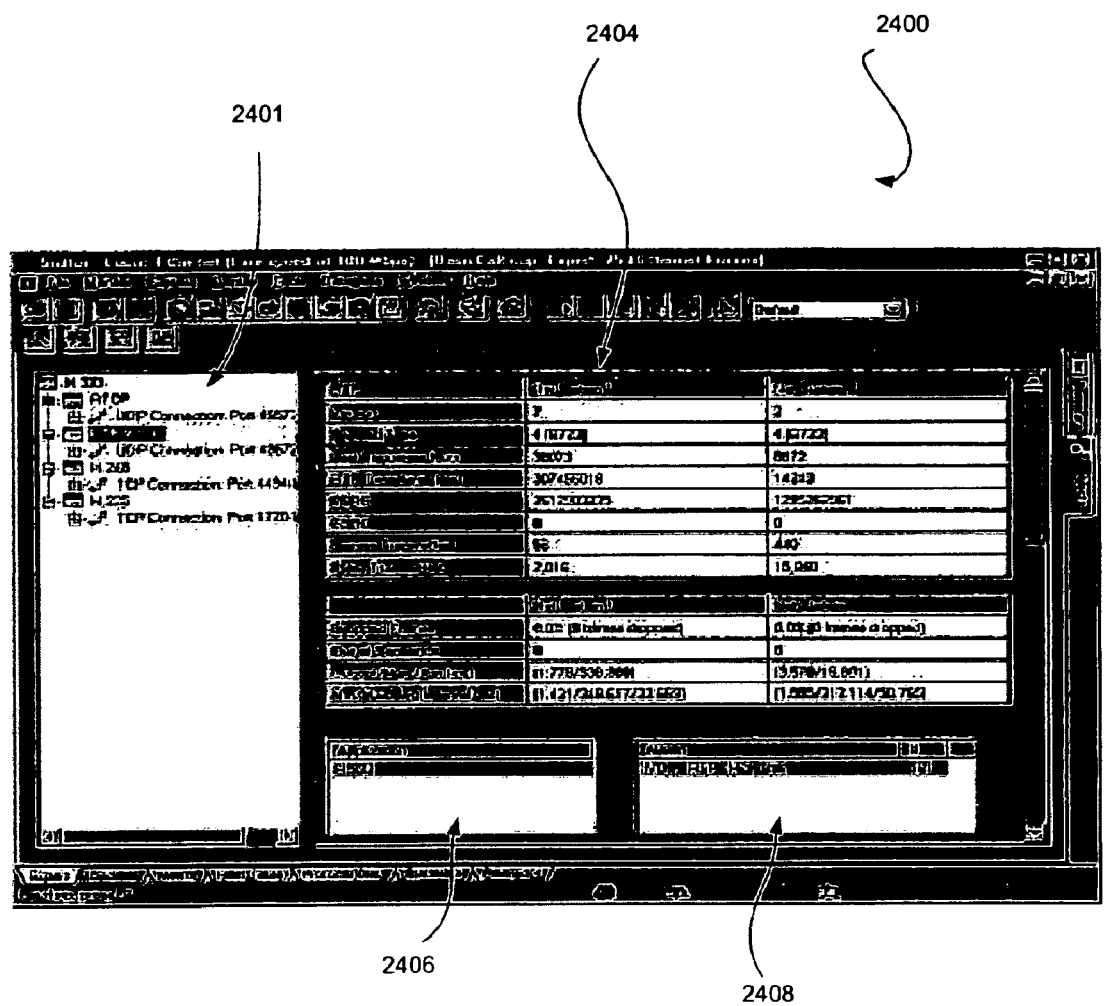
FIG. 24 illustrates another exemplary graphical user interface for displaying various objects associated with the collected network traffic information.

FIG. 24 illustrates another exemplary graphical user interface 2400 for displaying various objects associated with the collected network traffic information. Again, the present graphical user interface 2400 shows voice-specific protocols. It should be noted, however, that any type of protocol may be monitored. Graphical user interface 2400 is disclosed for illustrative purposes only, and should not be construed as limiting in any manner.

As shown in FIG. 24, a tree representation 2401 may be displayed as any desired combination of file directories including a plurality of subdirectories which, in turn, include a plurality of files. Each one of such entities (i.e. directories, subdirectories, files, etc.) is indicative of an associated object. By selecting one of such entities, collected data associated with a specific protocol layer(s) is displayed in a tabular display 2404.

Such tabular display 2404 includes a plurality of display portions each dedicated to displaying information corresponding with lower-layer objects associated with the object selected via the tree representation 2401. As an option, the tabular display 2404 may further include a request/response field which may list a plurality of requests and responses at the selected protocol layer.

The tree representation 2401 may thus be displayed as a file directory, and the objects may be accessed and reported by selecting directories and files, etc. of the file directory. It should be noted that the foregoing interfaces may take any desired form. Further, any desired tests, analysis techniques, etc. may be used in conjunction with the interfaces for enhanced reporting. One exemplary analysis technique will now be set forth.

Figure 25:
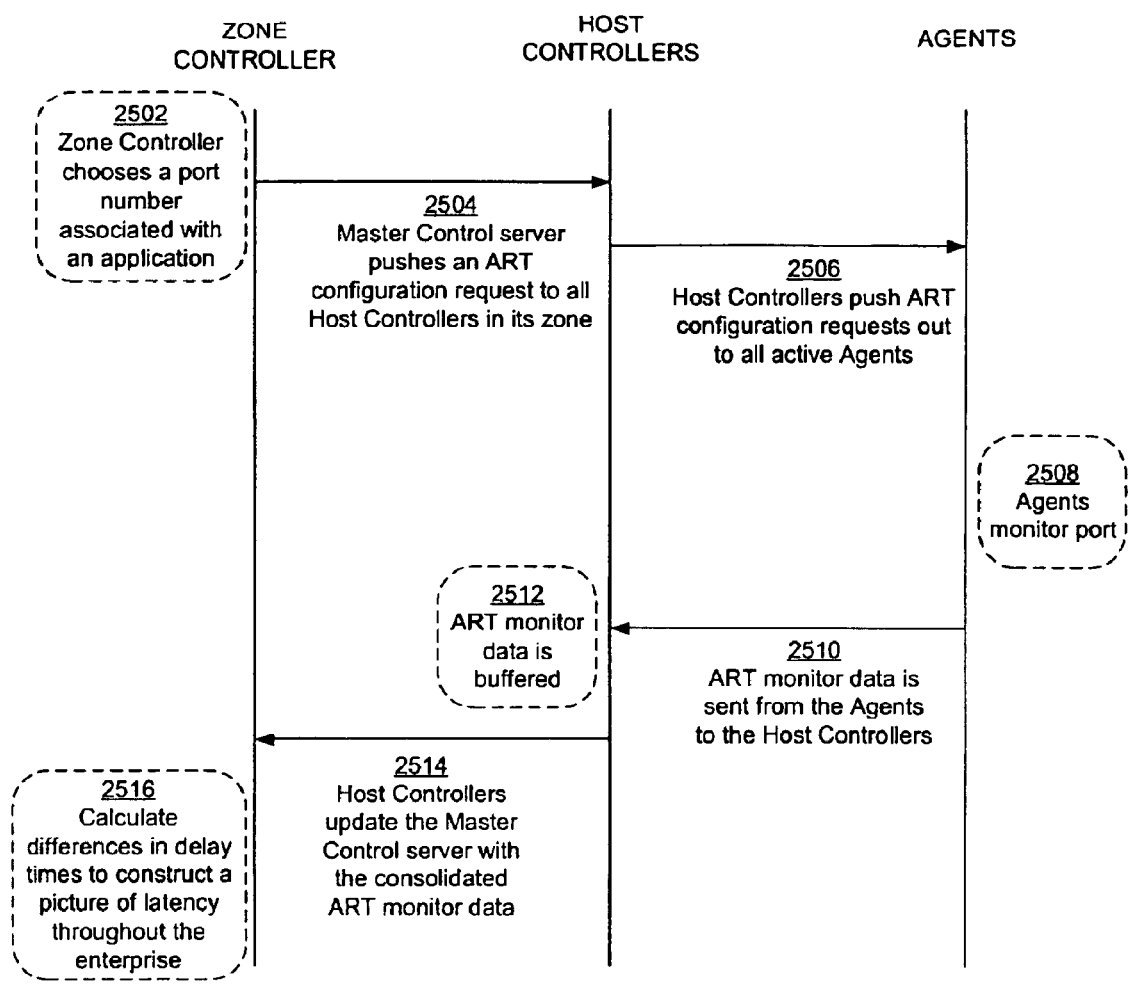
FIG. 25 depicts a specific flow in which an enterprise network analyzer is used to perform enterprise latency mapping.

FIG. 25 depicts a specific flow in which an enterprise network analyzer is used to perform enterprise latency mapping. According to the illustrative scenario, a zone controller 1602 chooses a port number associated with an application in operation 2502. In operation 2504, the zone controller of the zone controller 1602 pushes an ART configuration request to all host controllers 1002 in its zone.

The host controllers 1002 then push ART configuration requests out to all active agents 900 in operation 2506. In operation 2508, the agents 900 begin to monitor that port. ART monitor data is sent from the agents 900 to the host controllers 1002 in operation 2510 and buffered in operation 2512.

Then, the host controllers 1002 update the zone controller 1602 with the consolidated ART monitor data in operation 2514. In operation 2516, the differences in delay times are calculated to construct a picture of latency throughout the enterprise.

Figure 26:
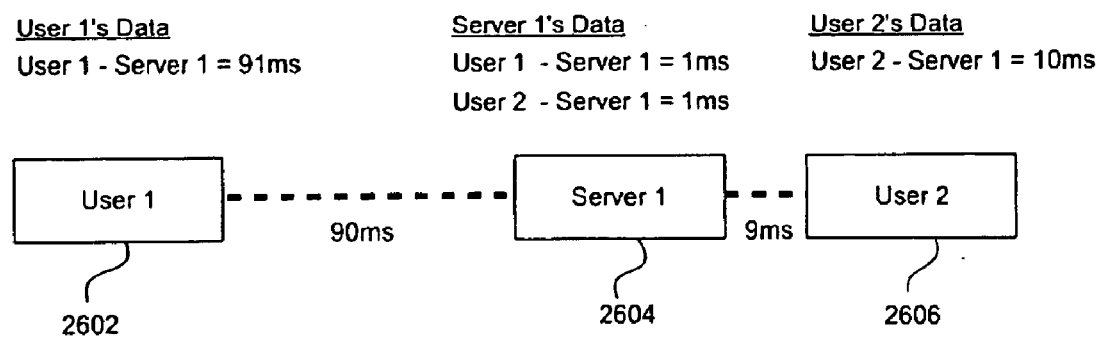
FIG. 26 is a graphical representation of an example of operation of FIG. 25.

FIG. 26 is a graphical representation of an example of operation 2516 of FIG. 25. As shown, a data transmission latency between User 1 2602 and Server 1 2604 is calculated by subtracting the time to send Server 1 data to User 1 2602 from the time it takes to send User 1 data to Server 1 2604 (or vice versa). In this example, the delay time is 90 ms (90 ms–1 ms). The delay time between User 2 2606 and Server 1 2604 is 9 ms (10 ms–1 ms).

Security and Other Applications

As an option, one embodiment may be provided for affording business rule-based network services utilizing a network. Initially, information relating to a plurality of computers is collected utilizing a plurality of agents coupled to the computers via a network. Next, the information is collected from the agents utilizing a plurality of host and/or zone controllers coupled to the agents. Then, a plurality of business rules is identified after which various services are provided utilizing the information based on the business rules.

In one embodiment, the services may include any one or more of analysis services, intrusion detection services, anti-virus services, and security services. Further, cybercop services may be provided.

As an option, another embodiment may be capable of scanning network traffic and detecting intrusions in the network, in addition to the various functionality set forth hereinabove. For example, the host controllers 1002 may be adapted for collecting information (i.e. network traffic information, etc.) from the agents 900, scanning the information, and detecting intrusions in the network. As another option, the host controllers 1002 may be further capable of cybercop services.

The foregoing scanning may be adapted for searching for known types of security events in the form of malicious programs such as viruses, worms, and Trojan horses. Still yet, [0]the scanning may be adapted for content scanning to enforce an organization's operational policies [i.e. detecting harassing or pornographic content, junk e-mails, misinformation (virus hoaxes), etc.].

Further, the zone controllers 1602 may be adapted for analyzing the output of the host controllers 1002, and executing security actions in response to any security events. Such security actions may include deleting files, quarantining files, cleaning files, etc. It should be noted that the foregoing security functionality associated with the host controllers 1002 and zone controllers 1602 may be interchangeable per the desires of the user.

Optionally, the host controllers 1002 and the zone controllers 1602 may operate based on business rules. Such business rules may be user-configurable. Still yet, the zone controllers 1602 may be further capable of integrated reporting based on information collected from multiple points on a network.

SNMP Interface

Simple Network Management Protocol (SNMP) is a User Datagram Protocol (UDP)-based application-layer protocol that facilitates the exchange of management information between network computers. It is not necessarily limited to TCP/IP networks. There are three versions of the SNMP protocol. SNMP and SNMPv2 do not have any mechanisms for authentication and privacy of the management data that are required to fully exploit SNMP. SNMPv3 addresses this deficiency and defines a set of Remote Function Calls (RFCs) which provide a framework for a fully secure mechanism for using SNMP for network management.

Managed computers are monitored and controlled using four basic SNMP commands shown in Table #4.

TABLE #4

Read
Write
Trap
Traversal Operations

The read command is used by a Network Management System (NMS) to monitor and collect management data from managed computers. The NMS examines different variables that are maintained by managed computers. The read command is achieved by performing SNMP GET, GETNEXT, AND GETBULK operations.

The write command is used by an NMS to control managed computers. The NMS changes the values of variables stored within managed computers. The write command is performed by a SNMP SET operation.

The trap command is used by managed computers to asynchronously report events to the NMS. When certain types of events occur, a managed computer sends a SNMP trap to the NMS.

Traversal operations are used by the NMS to determine which variables a managed computer supports and to sequentially gather information in variable tables, such as a routing table in a router.

The network analyzing system according to one embodiment may leverage the benefits of SNMP to collect additional management data present in network devices like switches, bridges, routers and hubs. The host controller 1002 may be made "SNMP aware" by building a SNMP manager capability into the host controller 1002. This may include performing the SNMP GET, GETNEXT and GETBULK operations on specific entities in Management Information Bases (MIBs) such as the MI14, RMON (RFC 2819), RMON2 (RFC 2021), bridge MIB (RF25493) and other MIBs and processing SNMP traps from such computers.

Using SNMP in a network analyzing system provides many benefits. For example, SNMP is the most widely-used network management protocol on TCP/IP-based networks.

Since deploying a custom agent 900 on network computers may not be possible for monitoring and collecting network data, as discussed in detail above, some other mechanism may be needed to extract this data. In such situation, SNMP may be used to poll the above specified MIBs and to collect useful data, and augment the enterprise management capabilities of a system.

Another benefit is that network computers within the domain of a host controller 1002 may be configured to report SNMP traps to the host controller 1002. By having a trap capture engine, the network analyzing system may be used to better report network problems reactively as well as perform some expert analysis to proactively suggest/prevent further network problems by an event-correlation mechanism.

EXAMPLE

The network analyzing system set forth herein provides centralized management of monitoring operations. Centralization translates into fewer hardware nodes on the network to manage, fewer points of failure, etc. It also means one main point is provided for all networks monitoring and troubleshooting whether at layers 1, 2, 3, 4, 5, 6 or 7.

The present network analyzing system is a fully integrated and scalable system that may be used with fully-switched enterprise networks to provide fill reporting capabilities across the entire enterprise as well as perform proactive monitoring, detecting and trouble shooting of network performance and problems. In particular, the system may be capable of concurrently capturing and monitoring data at any point in the corporate network. Further, the monitoring and trouble shooting of the entire network may be performed remotely and at a centralized location.

The system may be able to co-exist with, and even take advantage of, an existing infrastructure. For example, network analyzers already in the infrastructure may become data providers to the central server.

A powerful correlation engine may also be provided. The correlation engine, in one configuration, uses information that has been collected and sequenced from the entire enterprise. Analysis engines that mine the consolidated data being collected may also be provided. Multi-segment and multi-enterprise analysis also is possible according to one embodiment.

In addition, the system may be integrated with a wireless environment that would permit sending traps, alarms, and messages to and receiving commands from personal digital assistants (PDAs), wireless phones, land phones, wireless notebooks, etc.

The system according to one embodiment may support multiple operating systems (OS). The host controller 1002 and zone controller 1602 may be implemented as dedicated platforms, and the requirement for multiple OS support is not prevalent with respect to them.

The agent may, however, support multiple operating systems. The agent 900 may be deployed in heterogeneous OS environments and supports a full range of OS's when fully deployed. The agents 900 are then capable of providing enterprise-wide network coverage in a heterogeneous network environment.

FIG. 27 shows a table 2700 that lists several operating systems that may be supported by the system. It should be noted that the list of FIG. 27 is not intended to be a complete list of supported systems.

The network analyzing system may also provide the capability to "look back" into problems to understand how they started. The system may also automatically detect rogue computers, and may monitor and troubleshoot computers running on a wide variety of platforms.

As mentioned earlier, an automatic mapping of the entire network may also be S performed. A secure enterprise view of the entire corporate network may be generated and made accessible, via the Internet, from any location in the world. In addition, layer 2/layer 3 network topologies may be displayed in a hierarchical manner. Other types of mappings may also be provided. Network maps of computers may be created and used to quickly locate troublesome computers. As an option, the system may provide constant network baselining and continuous baseline monitoring.

As an option, the system has at least one centralized reporter server which generates and, if desired, transmits reports. Web-based user interfaces may be used for reporting, capturing and analysis, all viewable via a remote console. One type of report function provides in-depth historical reporting for network activity on multiple enterprises, segments, sub-nets and/or discrete nodes. Other types of output include decodes and analysis from the network analyzer. In any mode, network monitoring data may be transferred securely.

The network analyzing system may be constructed of a scalable architecture that does not compromise security. Network security manager-type functionality may also be provided. The present system performs equally well in both flat-repeated networks and fully-switched networks.

The system may fully utilize Remote Network Monitoring (RMON) data present in any network. RMON provides standard information that a network administrator may use to monitor, analyze, and troubleshoot a group of distributed local area networks (LANs) and interconnecting data transmission lines (e.g., T-1/E-1 and T-2/E-3 lines) from a central site. RMON specifically defines the information that any network monitoring system is able to provide.

RMON collects nine kinds of information, including packets sent, bytes sent, packets dropped, statistics by host, statistics by conversations between two sets of addresses, and certain kinds of events that have occurred. This information may be used to determine how much bandwidth or traffic each user is imposing on the network and what web sites are being accessed. Alarms may be set in order to be aware of impending problems.

Business Model

Figure 28:
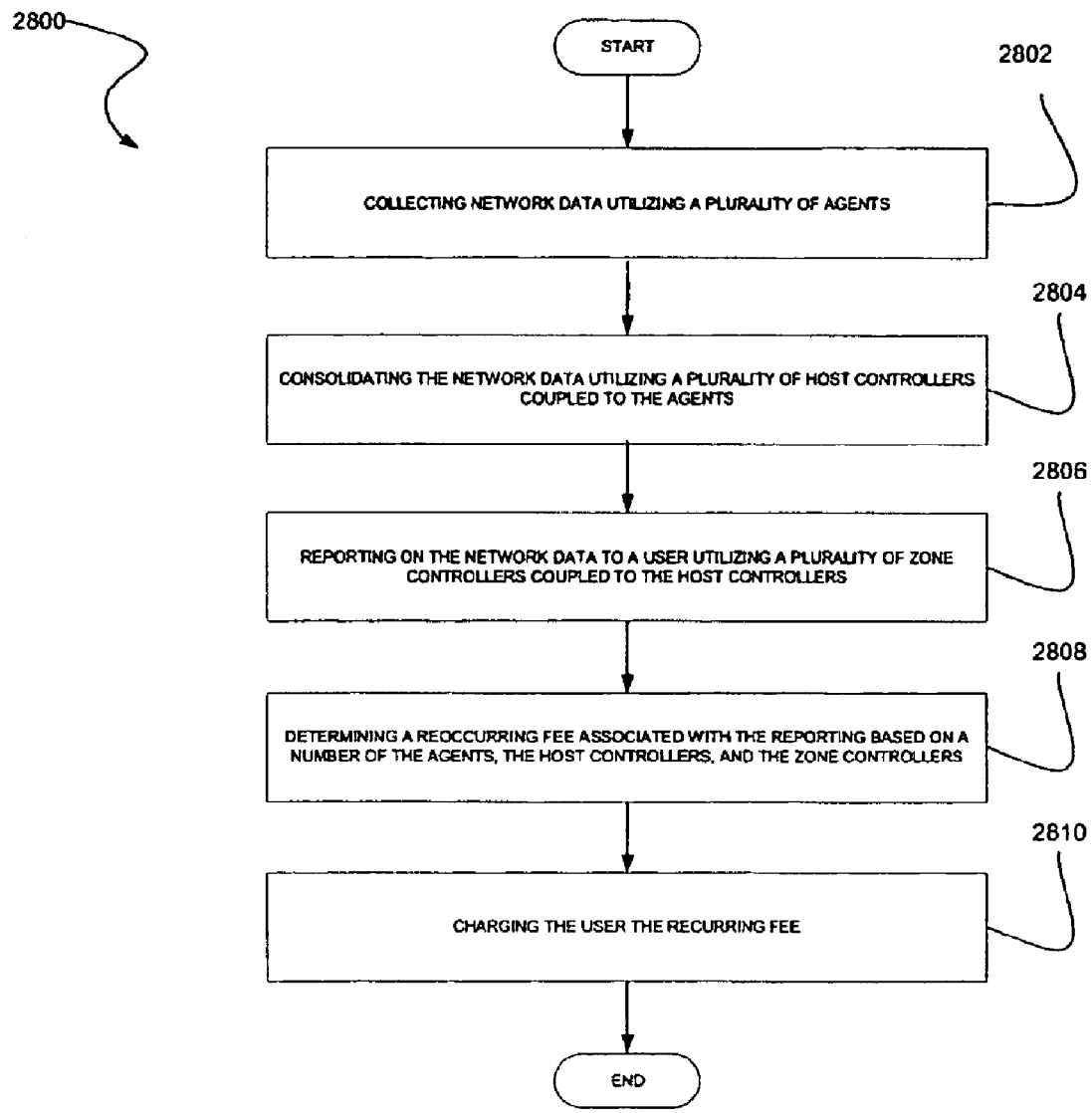
FIG. 28 illustrates a method for charging for network analysis, in accordance with one embodiment.

FIG. 28 illustrates a method 2800 for charging for network analysis, in accordance with one embodiment. It should be noted that the present method 2800 may be carried out in the context of the architecture and methods set forth hereinabove. Of course, the following principles may be applied in any desired context.

Initially, in operation 2802, network traffic information is collected utilizing a plurality of agents 900. Next, the network traffic information is consolidated (i.e. collected, grouped, organized, etc.) utilizing a plurality of host controllers 1002 coupled to the agents 900. This may be accomplished utilizing any of the techniques and functionality associated with the host controller 1002 set forth hereinabove, and/or using any other desired method.

Once consolidated, the network traffic information is reported to a user utilizing a plurality of zone controllers 1602 coupled to the host controllers 1002. See operation 2806. Of course, this may be accomplished utilizing any desired network-based interface, network analyzer interface, etc.

Next, in operation 2808, a reoccurring fee associated with the reporting is determined based on a number of the agents 900, the host controllers 1002, and/or the zone controllers 1602. An option, each agent 900 may incur a first reoccurring fee, each host controller 1002 may incur a second reoccurring fee greater than the first reoccurring fee, and each zone controller 1602 may incur a third reoccurring fee greater than the second reoccurring fee.

As yet another option, a gold, silver, bronze tiered system may be used to determine the reoccurring fee. In such embodiment, the number of agents 900, host controllers 1002, and/or zone controllers 1602 may be set for each tier. Still yet, a non-linear function may be used to calculate the reoccurring fee.

Of course, any type of calculation scheme may be used which takes into account the number of agents 900, host controllers 1002, and/or zone controllers 1602. Once calculated, the user is charged the recurring fee in operation 2810.

As an option, additional agents 900 may be coupled to the host controllers 1002 over time. In a similar manner, additional host controllers 1002 and/or zone controllers 1602 may be incorporated into a system to meet the changing needs of a corporate enterprise. Further, the reoccurring fee may be adjusted based on the number of additional components. Still yet, the user may be charged the recurring fee utilizing a network. Additional exemplary features associated with the present method 2800 will now be set forth.

The network analyzing system may thus include reusable technology that may support multiple product and service offerings. The present business model offers an option to offload the responsibility of network management to the network monitoring system. Such offloading reduces the number of IT staff needed for managing corporate networks, thereby drastically reducing the cost and manpower needed for monitoring, maintaining, and troubleshooting networks.

The present network analyzing system may be sold as a flexible, configurable solution that customers implement within their enterprises. It may also be priced for any size enterprise with dynamic subscription models supported based on easily comprehended metrics such as quantity of agents 900, host controllers 1002, and zone controllers 1602, etc. The present billing model allows users to deploy agents 900 on demand, and to be billed accordingly. The system may also be sold as an Original Equipment Manufacturer (OEM) product to service providers.

The system may support an Application Service Provider (ASP) offering for small, medium, and large businesses that would result in a direct recurring revenue stream. Ideally, recurring revenue streams may be established by marketing and selling the network analyzing system as a continuous monitoring and diagnosing service to customers that pay a recurring fee on any predefined interval such as monthly, quarterly, etc. Another business model provides flexibility by selling the system both as a product and a service.

One possible licensing model is based on a recurring subscription fee with flexible price points based on the complexity of the corporate network being monitored. The price points may be based on the number of agents 900, host controllers 1002, and/or zone controllers 1602. This model provides an extremely flexible pricing strategy for determining an amount to charge for subscription services for providing complete corporate enterprise network monitoring and troubleshooting on a continuous 24-hour basis to customers.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for reporting on network analysis, comprising:
   (a) collecting network traffic information utilizing a plurality of agents installed in computers distributed among a plurality of zones;
   (b) receiving the network traffic information collected from the agents associated with each zone at a separate host controller; and
   (c) transmitting a report on the network traffic information from the host controller to a computer coupled thereto via a network;
   wherein a plurality of consoles are coupled to the host controller for collecting the network traffic information from the host controller and displaying the network traffic information from the host controller, wherein a user interface is adapted for analyzing an output;
   wherein a map of the network is generated based on the network traffic information;
   wherein the report includes a plurality of objects in a tree representation, where the objects are displayed in the tree representation;
   wherein intrusion detection services are provided based on the network traffic information;
   wherein the network traffic information relates to wireless network traffic;
   wherein at least one zone controller chooses a port number associated with an application and pushes a configuration request to a plurality of the host controllers in an associated zone, and the host controllers push the configuration requests to the agents so that the agents begin to monitor a port associated with the port number, such that monitor data is sent from the agents to the host controllers and buffered, whereafter the host controllers update the at least one zone controller with consolidated monitor data, where differences in delay times are calculated to construct an enterprise picture of latency;
   wherein each host controller interfaces with at least one of the agents by determining whether a signal has been received from the at least one agent, where, in response to the signal, the at least one agent is sent commands including a first interval setting and configuration data such that the at least one agent transmits the network traffic information in a manner that is based on the configuration data and at a first time interval based on the first interval setting, each host controller being adapted for filtering unicast network traffic, thereby picking up flooded traffic on a domain to ensure that utilization calculations are correct;
   wherein each host controller interfaces with the at least one zone controller by determining whether instructions are received from the at least one zone controller the instructions including a second interval setting indicating a second time interval based on which the network traffic information is sent to the at least one zone controller and dictating the manner in which the at least one agent operates per the commands sent from each host controller to the agents, wherein the second interval setting is monitored and each host controller polls for the receipt of a demand over the network, the network traffic information being transmitted to the at least one zone controller in response to at least one of the demand and the cessation of the second time interval.

2. The method as recited in claim 1, wherein the report is capable of being displayed on the computer utilizing a network browser.

3. The method as recited in claim 1, wherein the network includes the Internet.

4. The method as recited in claim 1, and further comprising receiving a request at one of the host controllers for a report on the network traffic information corresponding to the zone associated with the host controller.

5. The method as recited in claim 4, wherein the report is transmitted in response to the request.

6. The method as recited in claim 1, wherein the report includes a network analyzer report.

7. A computer program product for reporting on network analysis, comprising:
  (a) computer code for collecting network traffic information utilizing a plurality of agents installed in computers distributed among a plurality of zones;
  (b) computer code for receiving the network traffic information collected from the agents associated with each zone at a separate host controller; and
  (c) computer code for transmitting a report on the network traffic information from the host controller to a computer coupled thereto via a network;
    wherein a plurality of consoles are coupled to the host controller for collecting the network traffic information from the host controller and displaying the network traffic information from the host controller, wherein a user interface is adapted for analyzing an output;
    wherein a map of the network is generated based on the network traffic information;
    wherein the report includes a plurality of objects in a tree representation, where the objects are displayed in the tree representation;
    wherein intrusion detection services are provided based on the network traffic information;
    wherein the network traffic information relates to wireless network traffic; wherein at least one zone controller chooses a port number associated with an application and pushes a configuration request to a plurality of the host controllers in an associated zone, and the host controllers push the configuration requests to the agents so that the agents begin to monitor a port associated with the port number, such that monitor data is sent from the agents to the host controllers and buffered, whereafter the host controllers update the at least one zone controller with consolidated monitor data, where differences in delay times are calculated to construct an enterprise picture of latency;
    wherein each host controller interfaces with at least one of the agents by determining whether a signal has been received from the at least one agent, where, in response to the signal, the at least one agent is sent commands including a first interval setting and configuration data such that the at least one agent transmits the network traffic information in a manner that is based on the configuration data and at a first time interval based on the first interval setting, each host controller being adapted for filtering unicast network traffic, thereby picking up flooded traffic on a domain to ensure that utilization calculations are correct;
    wherein each host controller interfaces with the at least one zone controller by determining whether instructions are received from the at least one zone controller, the instructions including a second interval setting indicating a second time interval based on which the network traffic information is sent to the at least one zone controller and dictating the manner in which the at least one agent operates per the commands sent from each host controller to the agents, wherein the second interval setting is monitored and each host controller polls for the receipt of a demand over the network, the network traffic information being transmitted to the at least one zone controller in response to at least one of the demand and the cessation of the second time interval.

8. The computer program product as recited in claim 7, wherein the report is capable of being displayed on the computer utilizing a network browser.

9. The computer program product as recited in claim 7, wherein the network includes the Internet.

10. The computer program product as recited in claim 7, and further comprising receiving a request at one of the host controllers for a report on the network traffic information corresponding to the zone associated with the host controller.

11. The computer program product as recited in claim 10, wherein the report is transmitted in response to the request.

12. The computer program product as recited in claim 7, wherein the report includes a network analyzer report.

13. A system for reporting on network analysis, comprising:
  (a) logic for collecting network traffic information utilizing a plurality of agents installed in computers distributed among a plurality of zones;
  (b) logic for receiving the network traffic information collected from the agents associated with each zone at a separate host controller; and
  (c) logic for transmitting a report on the network traffic information from the host controller to a computer coupled thereto via a network;
    wherein a plurality of consoles are coupled to the host controller for collecting the network traffic information from the host controller and displaying the network traffic information from the host controller, wherein a user interface is adapted for analyzing an output;
    wherein a map of the network is generated based on the network traffic information;
    wherein the report includes a plurality of objects in a tree representation, where the objects are displayed in the tree representation;
    wherein intrusion detection services are provided based on the network traffic information;
    wherein the network traffic information relates to wireless network traffic; wherein at least one zone controller chooses a port number associated with an application and pushes a configuration request to a plurality of the host controllers in an associated zone, and the host controllers push the configuration requests to the agents so that the agents begin to monitor a port associated with the port number, such that monitor data is sent from the agents to the host controllers and buffered, whereafter the host controllers update the at least one zone controller with consolidated monitor data, where differences in delay times are calculated to construct an enterprise picture of latency;

wherein each host controller interfaces with at least one of the agents by determining whether a signal has been received from the at least one agent, where, in response to the signal the at least one agent is sent commands including a first interval setting and configuration data such that the at least one agent transmits the network traffic information in a manner that is based on the configuration data and at a first time interval based on the first interval setting, each host controller being adapted for filtering unicast network traffic, thereby picking up flooded traffic on a domain to ensure that utilization calculations are correct;

wherein each host controller interfaces with the at least one zone controller by determining whether instructions are received from the at least one zone controller, the instructions including a second interval setting indicating a second time interval based on which the network traffic information is sent to the at least one zone controller and dictating the manner in which the at least one agent operates per the commands sent from each host controller to the agents, wherein the second interval setting is monitored and each host controller polls for the receipt of a demand over the network, the network traffic information being transmitted to the at least one zone controller in response to at least one of the demand and the cessation of the second time interval.

14. The system as recited in claim 13, wherein the report is capable of being displayed on the computer utilizing a network browser.

15. The system as recited in claim 13, wherein the network includes the Internet.

16. The system as recited in claim 13, and further comprising receiving a request at one of the host controllers for a report on the network traffic information corresponding to the zone associated with the host controller.

17. The system as recited in claim 16, wherein the report is transmitted in response to the request.

18. The system as recited in claim 13, wherein the report includes a network analyzer report.

19. A method for reporting on network analysis, comprising:

(a) collecting network traffic information utilizing a plurality of agents installed in computers distributed among a plurality of zones;

(b) receiving the network traffic information collected from the agents associated with each zone at a separate host controller;

(c) receiving a request at one of the host controllers for a report on the network traffic information corresponding to the zone associated with the host controller; and (d) transmitting the report from the host controller to a computer coupled thereto via a network;

(e) wherein the report is capable of being displayed on the computer utilizing a network browser, wherein a plurality of consoles are coupled to the host controller for collecting the network traffic information from the host controller and displaying the network traffic information from the host controller, wherein a user interface is adapted for analyzing an output;

wherein a map of the network is generated based on the network traffic information;

wherein the report includes a plurality of objects in a tree representation where the objects are displayed in the tree representation;

wherein intrusion detection services are provided based on the network traffic information;

wherein the network traffic information relates to wireless network traffic;

wherein at least one zone controller chooses a port number associated with an application and pushes a configuration request to a plurality of the host controllers in an associated zone, and the host controllers push the configuration requests to the agents so that the agents begin to monitor a port associated with the port number, such that monitor data is sent from the agents to the host controllers and buffered, whereafter the host controllers update the at least one zone controller with consolidated monitor data, where differences in delay times are calculated to construct an enterprise picture of latency;

wherein each host controller interfaces with at least one of the agents by determining whether a signal has been received from the at least one agent, where, in response to the signal, the at least one agent is sent commands including a first interval setting and configuration data such that the at least one agent transmits the network traffic information in a manner that is based on the configuration data and at a first time interval based on the first interval setting, each host controller being adapted for filtering unicast network traffic, thereby picking up flooded traffic on a domain to ensure that utilization calculations are correct;

wherein each host controller interfaces with the at least one zone controller by determining whether instructions are received from the at least one zone controller, the instructions including a second interval setting indicating a second time interval based on which the network traffic information is sent to the at least one zone controller and dictating the manner in which the at least one agent operates per the commands sent from each host controller to the agents, wherein the second interval setting is monitored and each host controller polls for the receipt of a demand over the network, the network traffic information being transmitted to the at least one zone controller in response to at least one of the demand and the cessation of the second time interval.

* * * * *

UNITED STATES PATENT AND TRADEMARK OFFICE
CERTIFICATE OF CORRECTION

PATENT NO. : 6,941,358 B1  Page 1 of 1
APPLICATION NO. : 10/029687
DATED : September 6, 2005
INVENTOR(S) : Joiner et al.

It is certified that error appears in the above-identified patent and that said Letters Patent is hereby corrected as shown below:

col. 18, line 65 replace "controller" with --controller,--;
    col. 21, line 10 replace "signal" with --signal,--;
    col. 22, line 2 replace "browser," with --browser;--;
    col. 22, line 12 replace "representation" with --representation,--.

Signed and Sealed this

Second Day of February, 2010

David J. Kappos
*Director of the United States Patent and Trademark Office*